(12) United States Patent
Holenarsipur et al.

(10) Patent No.: US 12,124,224 B2
(45) Date of Patent: *Oct. 22, 2024

(54) SENSORS FOR CHARACTERIZING MOVEMENT OF A WATCH CROWN

(71) Applicant: Apple Inc., Cupertino, CA (US)

(72) Inventors: Prashanth S. Holenarsipur, Fremont, CA (US); Mark T. Winkler, Menlo Park, CA (US); Mehmet Mutlu, Grover Beach, CA (US); David D. Dashevsky, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/143,405

(22) Filed: May 4, 2023

(65) Prior Publication Data
US 2023/0273572 A1    Aug. 31, 2023

Related U.S. Application Data

(63) Continuation of application No. 17/472,386, filed on Sep. 10, 2021, now Pat. No. 11,644,800, which is a continuation of application No. 16/379,551, filed on Apr. 9, 2019, now abandoned.

(60) Provisional application No. 62/657,531, filed on Apr. 13, 2018.

(51) Int. Cl.
*G04G 21/08* (2010.01)
*G01D 5/34* (2006.01)

(52) U.S. Cl.
CPC .............. *G04G 21/08* (2013.01); *G01D 5/34* (2013.01)

(58) Field of Classification Search
CPC .. G04G 21/08; G04G 617/04; G04G 617/045; G04G 621/08; G01D 5/34; G04C 3/007; G04C 3/005; G04C 3/001; G01P 3/36
See application file for complete search history.

(56) References Cited

U.S. PATENT DOCUMENTS

| | | |
|---|---|---|
| 4,203,280 A | 5/1980 | Ziegler |
| 7,557,795 B2 | 7/2009 | Kong et al. |
| 9,010,945 B2 | 4/2015 | Vasylyev |

(Continued)

FOREIGN PATENT DOCUMENTS

| | | |
|---|---|---|
| AU | 2007313960 B2 | 5/2008 |
| CH | 706101 | 8/2013 |

(Continued)

*Primary Examiner* — Edwin A. Leon
(74) *Attorney, Agent, or Firm* — Brownstein Hyatt Farber Schreck, LLP

(57) ABSTRACT

A watch body includes a housing at least partially defining an interior of the watch body. A retaining feature is formed in or extends from the housing. A watch crown is retained by the retaining feature and is operable to be rotated by a user. The watch crown has a surface facing the housing. The watch crown is entirely external to the interior of the watch body. An electromagnetic radiation source is disposed within the housing and is operable to emit a beam of electromagnetic radiation toward the surface. A sensor is disposed within the housing and is operable to characterize a movement of the watch crown based at least in part on a portion of the beam of electromagnetic radiation that impinges on the surface and is redirected by the surface.

20 Claims, 29 Drawing Sheets

(56) References Cited

U.S. PATENT DOCUMENTS

| | | |
|---|---|---|
| 9,453,939 B2 | 9/2016 | Tortora et al. |
| 9,535,501 B1 | 1/2017 | Moussette |
| 9,547,280 B2 | 1/2017 | Born et al. |
| 9,638,587 B2 | 5/2017 | Marquas |
| 9,753,436 B2 | 9/2017 | Ely et al. |
| 9,851,613 B2 | 12/2017 | Noble et al. |
| 9,952,558 B2 | 4/2018 | Ely |
| 9,971,407 B2 | 5/2018 | Holenarsipur |
| 10,019,097 B2 | 7/2018 | Ely |
| 10,048,802 B2 | 8/2018 | Shedletsky |
| 10,061,399 B2 | 8/2018 | Bushnell |
| 10,145,711 B2 | 12/2018 | Boonsom et al. |
| 10,203,662 B1 | 2/2019 | Lin |
| 10,222,756 B2 | 3/2019 | Ely |
| 10,241,593 B2 | 3/2019 | Chen |
| 10,503,271 B2 | 12/2019 | Ely |
| 10,599,101 B2 | 3/2020 | Rothkopf |
| 10,610,157 B2 | 4/2020 | Pandya et al. |
| 10,664,074 B2 | 5/2020 | Moussette |
| 11,036,318 B2 | 6/2021 | Kuboyama |
| 11,194,298 B2 | 12/2021 | Roach et al. |
| 11,360,440 B2 | 6/2022 | Perkins |
| 11,432,766 B2 | 9/2022 | Pandya |
| 11,531,306 B2 | 12/2022 | Ely |
| 11,644,800 B2 | 5/2023 | Holenarsipur et al. |
| 11,754,981 B2 | 9/2023 | Perkins |
| 2009/0025872 A1 | 1/2009 | Nilsen et al. |
| 2016/0098016 A1* | 4/2016 | Ely ........................ G04G 21/00 368/308 |
| 2017/0090599 A1* | 3/2017 | Kuboyama .......... H03K 17/962 |
| 2019/0317454 A1 | 10/2019 | Holenarsipur et al. |
| 2021/0089136 A1 | 3/2021 | Hossain et al. |
| 2021/0199475 A1 | 7/2021 | Dantler et al. |
| 2023/0086536 A1 | 3/2023 | Li et al. |
| 2023/0258479 A1 | 8/2023 | Li |

FOREIGN PATENT DOCUMENTS

| | | |
|---|---|---|
| CN | 101641663 A | 2/2010 |
| CN | 205121417 U | 3/2016 |
| CN | 205721636 U | 11/2016 |
| CN | 106557218 A | 4/2017 |
| CN | 206147524 U | 5/2017 |
| CN | 206209589 U | 5/2017 |
| CN | 107122088 A | 9/2017 |
| CN | 107966895 A | 4/2018 |
| KR | 1020170106395 A | 9/2017 |
| KR | 1020200027010 A | 3/2020 |
| WO | WO 10/001299 | 1/2010 |
| WO | 2014200766 A1 | 12/2014 |
| WO | 2015122885 A1 | 8/2015 |
| WO | 2016196171 A1 | 12/2016 |
| WO | 2016208835 A1 | 12/2016 |
| WO | 2018236553 A1 | 12/2018 |

\* cited by examiner

| SPEED | Δλ | $f_B$ |
|---|---|---|
| 1 mm/s | $6.3 \times 10^{-9}$ nm | 2.13 kHz |
| 10 mm/s | $6.3 \times 10^{-8}$ nm | 21.3 kHz |
| 100 mm/s | $6.3 \times 10^{-7}$ nm | 213 kHz |
| 1 m/s | $6.3 \times 10^{-6}$ nm | 2.13 MHz |

SENSORS FOR CHARACTERIZING MOVEMENT OF A WATCH CROWN

CROSS-REFERENCE TO RELATED APPLICATION

This application is a continuation of U.S. patent application Ser. No. 17/472,386, filed Sep. 10, 2021, which is a continuation of U.S. patent application Ser. No. 16/379,551, filed Apr. 9, 2019, now abandoned, which is a nonprovisional of, and claims the benefit under 35 U.S.C. § 119(e) of, U.S. Provisional Patent Application No. 62/657,531, filed Apr. 13, 2018, the contents of which are incorporated by reference as if fully disclosed herein.

FIELD

The described embodiments relate generally to an electronic watch or other wearable electronic device. More particularly, the described embodiments relate to an electronic watch having a crown, and to techniques for sensing or characterizing movement of the crown.

BACKGROUND

An electronic watch or other wearable electronic device may have a crown that can be manipulated to provide user input to the device. The user input may take the form of movement or non-movement of the crown, a direction of rotation of the crown, a speed of rotation of the crown, an acceleration of the crown, a direction of translation of the crown (e.g., whether the crown is being translated inward or outward with respect to the watch), or a position of the crown (e.g., an angle of rotation or state of translation of the crown). These inputs may be characterized by one or more sensors associated with the crown, and may be reported to a processor for use by system utilities or user applications. In some cases, a processor may update a state of the watch (e.g., a displayed time, displayed screen, or speaker volume), provide feedback to an application running locally on (or remotely from) the device, or provide haptic feedback to acknowledge receipt of the user input. Often the one or more sensors may include an optical encoder that senses rotational parameters of the crown, and a tactile switch that senses translational parameters of the crown.

SUMMARY

Embodiments of the systems, devices, methods, and apparatus described in the present disclosure are directed to an electronic watch (e.g., a smart watch) or other wearable electronic device having a crown, in which user input is provided to the device by moving the crown, and parameters characterizing movement of the crown are sensed by a sensor system including one or more at least partially coherent electromagnetic radiation sources (e.g., coherent or partially coherent electromagnetic radiation sources, such as edge-emitting laser diodes, vertical-cavity surface-emitting lasers (VCSELs), quantum-dot lasers (QDLs), or superluminescent diodes) that emit, receive, and self-mix electromagnetic radiation (e.g., visible or invisible light) at least partially coherently. An electromagnetic radiation source of the sensor system may emit a beam of electromagnetic radiation toward a crown surface (e.g., a watch crown surface). The beam of electromagnetic radiation may depend on a coherent mixing of electromagnetic radiation within a resonant cavity of the electromagnetic radiation source. The coherent mixing of electromagnetic radiation may include a mixing of a first amount of electromagnetic radiation generated by the electromagnetic radiation source and a second amount of electromagnetic radiation redirected (e.g., reflected or scattered) into the resonant cavity by the watch crown surface. A sensor of the sensor system may measure a first parameter of the beam of electromagnetic radiation. For example, the sensor may measure a modulated power of the beam of electromagnetic radiation. The sensor may use the first parameter of the beam of electromagnetic radiation to determine a value of a second parameter characterizing movement of the crown. The second parameter may include, for example, movement or non-movement of the crown, a direction of rotation of the crown, a speed of rotation of the crown, an acceleration of the crown, a direction of translation of the crown (e.g., whether the crown is being translated inward or outward with respect to the device), or a position of the crown (e.g., an angle of rotation or state of translation of the crown).

In a first aspect, the present disclosure describes an electronic watch. The electronic watch may include a housing, a user-operable watch crown mounted to the housing, an electromagnetic radiation source, and a sensor. The electromagnetic radiation source may emit a beam of electromagnetic radiation toward a watch crown surface. The beam of electromagnetic radiation may depend on a coherent mixing of electromagnetic radiation within a resonant cavity of the electromagnetic radiation source. The coherent mixing may include a mixing of a first amount of electromagnetic radiation generated by the electromagnetic radiation source and a second amount of electromagnetic radiation redirected into the resonant cavity by the watch crown surface. The sensor may measure a first parameter of the beam of electromagnetic radiation and determine, using the measurement of the first parameter, a value of a second parameter characterizing movement of the watch crown.

In another aspect, the present disclosure describes a watch crown sensor system. The watch crown sensor system may include a first electromagnetic radiation source emitting a first beam of electromagnetic radiation, a second electromagnetic radiation source emitting a second beam of electromagnetic radiation, and a set of one or more sensors. The second electromagnetic radiation source may have a known position and orientation with respect to the first electromagnetic radiation source. Each of the first beam of electromagnetic radiation and the second beam of electromagnetic radiation may depend on a coherent mixing of electromagnetic radiation within a first resonant cavity of the first electromagnetic radiation source or a second resonant cavity of the second electromagnetic radiation source. The coherent mixing of electromagnetic radiation within each of the first resonant cavity and the second resonant cavity may include a mixing of a first amount of electromagnetic radiation generated by the first electromagnetic radiation source or the second electromagnetic radiation source and a second amount of electromagnetic radiation redirected into the first resonant cavity or the second resonant cavity by the watch crown surface. The set of one or more sensors may measure a first parameter of each of the first beam of electromagnetic radiation and the second beam of electromagnetic radiation, and may determine, using the measurements of the first parameter, a value of a second parameter characterizing movement of a watch crown.

In still another aspect of the disclosure, a method of determining a value of a parameter characterizing movement of a watch crown is described. The method may include generating a first amount of coherent light in a resonant cavity of a laser; receiving into the resonant cavity a second amount of coherent light redirected from a watch crown surface; emitting from the resonant cavity a beam of coherent light dependent on a coherent mixing of the first amount of coherent light and the second amount of coherent light; measuring a junction voltage or a bias current of the laser, the junction voltage or the bias current dependent on the coherent mixing of the first amount of coherent light and the second amount of coherent light within the resonant cavity; and determining, from at least the measurement of the junction voltage or the bias current, the value of the parameter characterizing movement of the watch crown.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1:
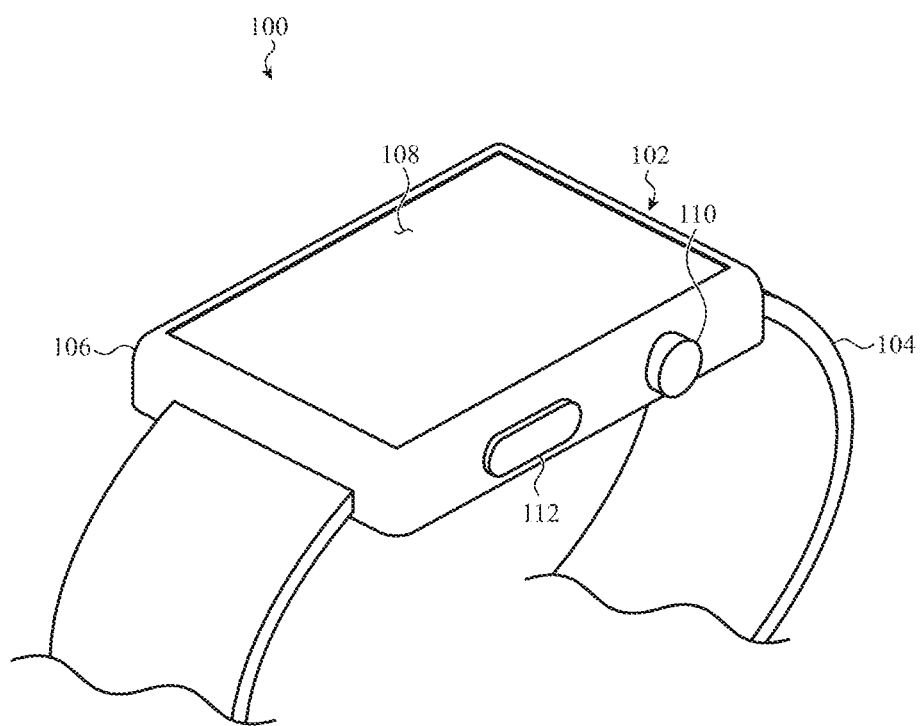
FIG. 1 shows an example of an electronic watch having a crown.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The following disclosure relates to techniques for characterizing the movement of a watch crown (e.g., a digital crown). The techniques utilize a sensor system that includes one or more coherent or partially coherent electromagnetic radiation sources, such as edge-emitting laser diodes, VCSELs, QDLs, or superluminescent diodes. An electromagnetic radiation source of the sensor system may emit a beam of electromagnetic radiation (e.g., a beam of coherent or partially coherent light) toward a watch crown surface (e.g., a surface of a shaft of the crown, or a surface of a cap of the crown). In some embodiments, the watch crown surface may be optically flat (e.g., providing specular reflections) or rough (e.g., providing scattering/diffusive reflections). In some embodiments, the watch crown surface may be defined by a bidirectional reflectance distribution function (BRDF). The watch crown surface need not have a structured optical pattern (e.g., an encoder pattern) thereon, but works if it does have a structured optical pattern thereon. In some cases, feedback that varies based on changes in the structured optical pattern may provide an additional or secondary means for characterizing watch crown movement. The beam of electromagnetic radiation may depend on a coherent mixing of electromagnetic radiation within a resonant cavity of the electromagnetic radiation source. The coherent mixing of electromagnetic radiation may include a mixing of a first amount of electromagnetic radiation generated by the electromagnetic radiation source and a second amount of electromagnetic radiation redirected (e.g., reflected or scattered) into the resonant cavity by the watch crown surface. The coherent mixing of electromagnetic radiation modifies the electric field, carrier distribution, and lasing threshold of a resonant cavity, producing a measurable interference signal (or interferometric signal). Parameters of the interference signal may be measured by measuring a junction voltage of the electromagnetic radiation source (which junction voltage may modulate in response to the coherent mixing of electromagnetic radiation within the resonant cavity when the electromagnetic radiation source is biased at a constant bias current), by measuring a bias current of the electromagnetic radiation source (which bias current may modulate in response to coherent mixing of electromagnetic radiation within the resonant cavity when the electromagnetic radiation source is biased at a constant junction voltage), or by measuring a power (e.g., an optical power) of the beam of electromagnetic radiation (which power may also modulate in response to the coherent mixing). The junction voltage or bias current may be measured by an electrical sensor, and the power (e.g., optical power) may be measured by an optoelectronic sensor.

The measurement of the interference signal may be used to determine a value of a second parameter characterizing movement of the crown. For example, the interference signal may be measured over a particular time interval, and input to a fast Fourier transform (FFT) algorithm to determine a spectral density of the interference signal. The strongest frequency component of the interference signal can be interpreted as a Doppler shift between the electromagnetic radiation generated by an electromagnetic radiation source and electromagnetic radiation received back into a resonant cavity of the electromagnetic radiation source. Hence, the Doppler shift contains information about the speed of rotation (velocity) of the crown. Because of the nonlinear distortion that occurs in the coherent mixing process, the phase of the second harmonic of the interference signal contains information about the direction of rotation of the crown. Alternatively (or additionally), movement of a crown (e.g., speed of rotation, direction of movement, and so on) may be deduced in the time domain.

In some embodiments, a watch crown assembly may include a watch crown, an electromagnetic radiation source, and a sensor. The electromagnetic radiation source may emit a beam of electromagnetic radiation toward a watch crown surface. The beam of electromagnetic radiation may depend on a coherent mixing of electromagnetic radiation within a resonant cavity of the electromagnetic radiation source. The coherent mixing may include a mixing of a first amount of electromagnetic radiation generated by the electromagnetic radiation source and a second amount of electromagnetic radiation redirected into the resonant cavity by the watch crown surface. A sensor may measure a first parameter of the beam of electromagnetic radiation and determine, using the measurement of the first parameter, a value of a second parameter characterizing movement of the watch crown.

In some embodiments, a watch crown sensor system may include a first electromagnetic radiation source, a second electromagnetic radiation source, and a set or one or more sensors. The first electromagnetic radiation source may emit a first beam of electromagnetic radiation, and the second electromagnetic radiation source may emit a second beam of electromagnetic radiation. The second electromagnetic radiation source may have a known position and orientation with respect to the first electromagnetic radiation source. Each of the first beam of electromagnetic radiation and the second beam of electromagnetic radiation may depend on a coherent mixing of electromagnetic radiation within a first resonant cavity of the first electromagnetic radiation source or a second resonant cavity of the second electromagnetic radiation source. The coherent mixing of electromagnetic radiation within each of the first resonant cavity and the second resonant cavity may include a mixing of a first amount of electromagnetic radiation generated by the first electromagnetic radiation source or the second electromagnetic radiation source and a second amount of electromagnetic radiation redirected into the first resonant cavity or the second resonant cavity by the watch crown surface. The electromagnetic radiation that is redirected into the first or second resonant cavity may be redirected from different portions of the circumference of a shaft of the watch crown. The set of one or more sensors may measure a first parameter of each of the first beam of electromagnetic radiation and the second beam of electromagnetic radiation, and may determine, using the measurements of the first parameter, a value of a second parameter characterizing movement of the watch crown. The use of measurements associated with different electromagnetic radiation sources that emit electromagnetic radiation toward different portions of a surface can enable the watch crown sensor system to factor out (or account for) certain alignment tolerances between the watch crown sensor system and the watch crown.

These and other embodiments are discussed with reference to FIGS. 1-37. However, those skilled in the art will readily appreciate that the detailed description given herein with respect to these figures is for explanatory purposes only and should not be construed as limiting.

FIG. 1 shows an example of an electronic watch 100 having a crown (i.e., a watch crown). The electronic watch may include a watch body 102 and a watch band 104. The watch body 102 may include a housing 106. As an example, the housing 106 may define a perimeter (e.g., a set of edges or sidewalls) of the watch body 102. The housing 106 may also define part or all of a watch face or a watch back. The housing 106 may be formed by one or more housing members, which housing member(s) may include metallic, plastic, ceramic, crystal, or other types of housing members.

In some embodiments, as shown, the housing 106 may define one or more of a watch face opening, a watch crown shaft opening, or a button opening. The housing 106 may also define a watch back opening (not shown). A cover 108 may be mounted to the housing 106 such that it covers the watch face opening. The cover 108 may be transparent, and may protect a display mounted within the housing 106. The display may be viewable by a user through the cover 108. In some cases, the cover 108 may be part of a display stack, which display stack may include a touch sensing or force sensing capability. The display may be configured to depict a graphical output of the electronic watch 100, and a user may interact with the graphical output (e.g., using a finger or stylus). As one example, a user may interact with a graphic, icon, or the like by touching or pressing a corresponding location on the cover 108. In some examples, the cover 108 may include a crystal, such as a sapphire crystal. In other examples, the cover 108 may be formed of glass, plastic, or other materials. A second cover may be mounted to the housing 106 such that it covers a watch back opening. In alternate embodiments, the housing 106 may not include the watch face opening or the watch back opening, and the front cover 108 or back cover may be provided by portions of the housing 106.

The watch body 102 may include at least one input device or selection device, such as a crown, scroll wheel, knob, dial, button, or the like, which input device may be operated by a user of the electronic watch 100. For example, the watch body 102 may include a crown 110. The crown may include a shaft that extends through a crown shaft opening in the housing 106. The crown 110 may be manipulated by a user to rotate or translate the shaft. The shaft may be mechanically, electrically, magnetically, optically, or otherwise coupled to components (e.g., one or more sensors) within the housing 106. A user may manipulate the crown 110 to, in turn, manipulate or select various elements displayed on the display, to adjust a volume of a speaker, to turn the electronic watch 100 on or off, to provide input to a system utility or user application, and so on. In addition to the crown 110, the watch body 102 may include a button 112. The button 112 may extend through a button opening in the housing 106.

The housing 106 may include structures for attaching the watch band 104 to the watch body 102. In some cases, the structures may include elongate recesses or apertures through which ends of the watch band 104 may be inserted and attached to the watch body 102. In other cases, the structures may include indents (e.g., dimples or depressions) in the housing 106, which indents may receive ends of spring pins that are attached to or threaded through ends of the watch band 104 to attach the watch band 104 to the watch body 102.

The watch band 104 may be used to secure the electronic watch 100 to a user, another device, a retaining mechanism, and so on.

Other electronic devices that may incorporate a crown include other wearable electronic devices, other timekeeping devices, other health monitoring or fitness devices, other portable computing devices, mobile phones (including smart phones), tablet computing devices, digital media players, or the like.

Figure 2:
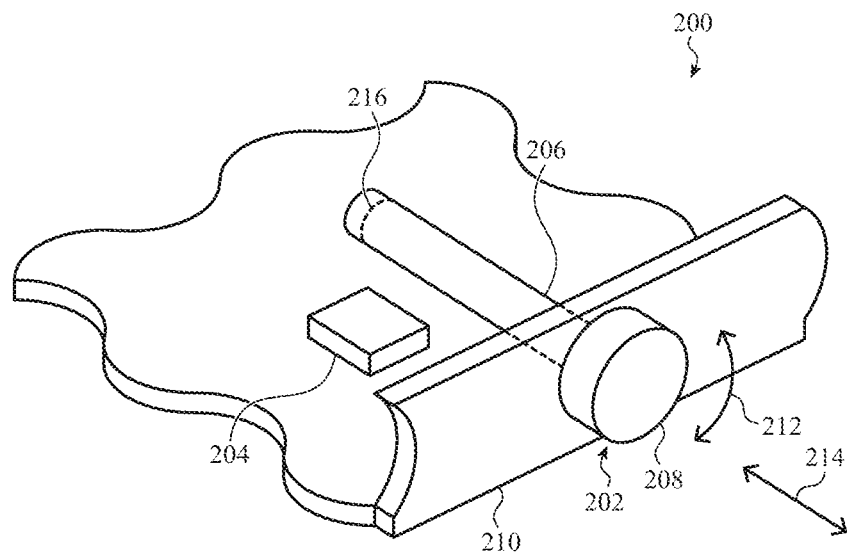
FIG. 2 shows a portion of a watch body (e.g., a portion of the watch body shown in FIG. 1) including a watch crown assembly.

FIG. 2 shows a portion of a watch body (e.g., a portion of the watch body 102 shown in FIG. 1) including a watch crown assembly 200. The watch crown assembly 200 may include a crown 202 and a sensor system 204. The crown 202 may include a shaft 206 that extends through and into the watch body (e.g., through a housing 210 of the watch body), and a cap 208 that is affixed to the shaft 206 and at least partially external to the watch body. The cap 208 may be touched, rotated, or translated by a user to operate the crown 202. The sensor system 204 may detect movement of the crown 202. The sensor system 204 may be mounted in or on the watch body, and in some cases may be mounted partially or wholly within the housing 210.

In some embodiments, the sensor system 204 may include a set of one or more coherent or partially coherent electromagnetic radiation sources (e.g., one or more edge-emitting laser diodes, VCSELs, QDLs, or superluminescent diodes) and a sensor (e.g., one or more electronic or optoelectronic circuits). More electromagnetic radiation source/sensor pairs provide multiple measurements that may be averaged or otherwise combined to improve system performance or reliability. For example, more electromagnetic radiation source/sensor pairs may increase a system's signal-to-noise ratio (SNR). Each of the electromagnetic radiation sources may emit a beam of electromagnetic radiation (e.g., visible or invisible light) toward a surface of the watch crown (i.e., toward a watch crown surface), and may be operated in a continuous wave mode or a pulsed mode. In the case of multiple electromagnetic radiation sources being operated in a pulsed mode, the electromagnetic radiation sources may be operated to emit electromagnetic radiation at the same time or at different times (e.g., in a time-multiplexed manner that can minimize cross-talk between different electromagnetic radiation source/sensor pairs). A beam of electromagnetic radiation may depend on a coherent mixing of electromagnetic radiation within a resonant cavity of the electromagnetic radiation source. The coherent mixing of electromagnetic radiation may include a mixing of a first amount of electromagnetic radiation generated by the electromagnetic radiation source and a second amount of electromagnetic radiation redirected (e.g., reflected or scattered) into the resonant cavity by the watch crown surface. In some cases, an electromagnetic radiation source may be coupled to a temperature controller to stabilize its operating temperature.

In some cases, the sensor may include a radiation-sensitive element, such as an optoelectronic sensor (e.g., a photodetector) adjacent the electromagnetic radiation source or a photodetector stacked together with (e.g., under) or integrated with the electromagnetic radiation source. Such a sensor may monitor a power (e.g., an optical power) of the beam of electromagnetic radiation, which power may modulate in response to the coherent mixing of electromagnetic radiation within a resonant cavity of the electromagnetic radiation source. In other cases, the sensor may include an electrical sensor, such as a circuit that monitors a junction voltage or bias current of the electromagnetic radiation source, which junction voltage or bias current may modulate due to the coherent mixing of electromagnetic radiation within the resonant cavity of the electromagnetic radiation source. In either case, the sensor may measure at least a first parameter of the beam of electromagnetic radiation by measuring the power, junction voltage, or bias current, and may determine, using at least the first parameter, a value of at least a second parameter characterizing movement of the crown 202. The second parameter may indicate one or more of: movement or non-movement of the crown 202, a direction of rotation 212 of the crown 202, a speed of rotation of the crown 202, an acceleration of the crown 202, a direction of translation 214 of the crown 202 (e.g., whether the crown 202 is being translated inward or outward with respect to the watch body), or a position of the crown 202 (e.g., an angle of rotation or state of translation of the crown 202).

In some embodiments, the components of the sensor system 204 may be mounted on a common substrate, or be part of a common application-specific integrated circuit (ASIC), or be included in a common module. When mounted in a common module, the module may have one or more apertures or openings through which light may be emitted from or received into the module. Each aperture or opening may be covered (e.g., by a lens or cover that allows the coherent light to pass) or uncovered.

Figure 3:
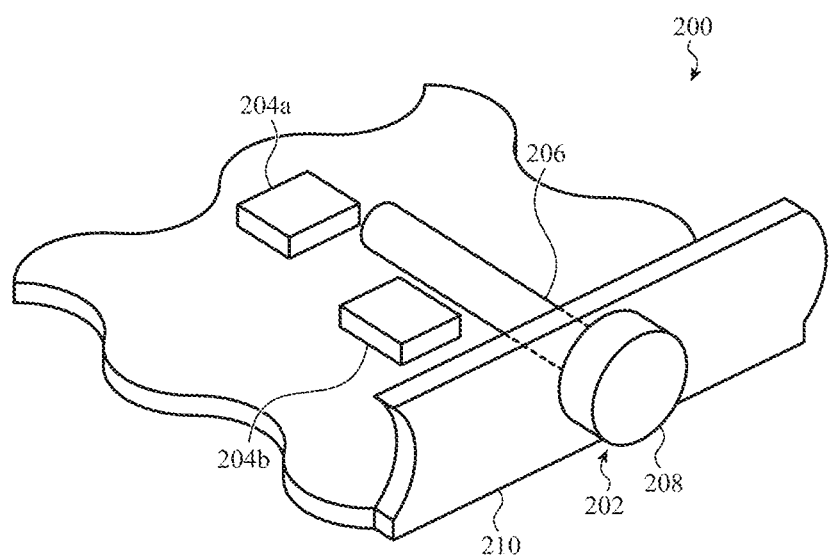
FIG. 3 shows alternative or additional positions for components of a sensor system.

By way of example, the sensor system shown in FIG. 2 is positioned to emit electromagnetic radiation toward, and receive redirected electromagnetic radiation from, one or more portions of a circumference 216 of the shaft 206. As shown in FIG. 3, the sensor system 204 may alternatively or additionally be positioned to emit electromagnetic radiation toward, and receive redirected electromagnetic radiation from, a surface at an end of the shaft 206 (e.g., when the sensor system 204 includes components positioned at 204a), or a surface of the cap 208 facing the watch body (e.g., when the sensor system 204 includes components positioned at 204b). In some embodiments, the sensor system 204 may be distributed across two or more of the positions shown in FIGS. 2 and 3, or at other positions.

Figure 4:
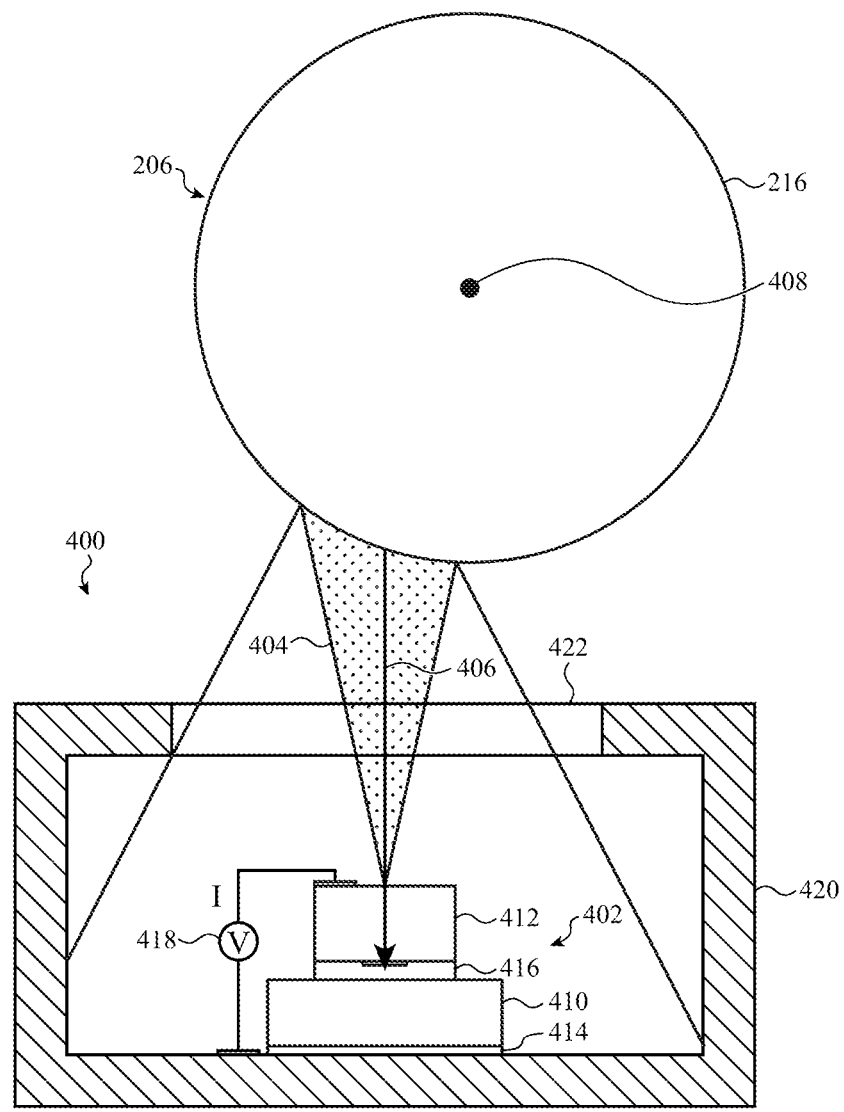
FIG. 4 shows a first embodiment of a sensor system such as the sensor system described with reference to FIG. 2.

FIG. 4 shows a first embodiment of a sensor system such as the sensor system 204 described with reference to FIG. 2. The embodiment is illustrated with respect to a cross-section of the shaft 206 of the crown 202. The sensor system 400 may include an electromagnetic radiation source 402 positioned to emit a beam of electromagnetic radiation 404 (e.g., a beam of coherent or partially coherent light) toward the circumference 216 of the shaft 206. The beam of electromagnetic radiation 404 may depend on a coherent mixing of electromagnetic radiation within a resonant cavity of the electromagnetic radiation source 402. The coherent mixing of electromagnetic radiation may include a mixing of a first amount of electromagnetic radiation generated by the electromagnetic radiation source 402, and a second amount of electromagnetic radiation redirected (e.g., reflected or scattered) from the circumference 216 of the shaft 206 into the electromagnetic radiation source 402 (e.g., into a resonant cavity of the electromagnetic radiation source 402). The axis 406 of the beam of electromagnetic radiation 404 may intersect the circumference 216 of the shaft 206, but may not intersect the longitudinal axis 408 of the shaft 206. In some embodiments, the axis 406 of the beam of electromagnetic radiation 404 may be neither perpendicular nor parallel to tangents of the circumference of the shaft 206 (e.g., the axis 406 may intersect the shaft 206 at an acute angle).

The electromagnetic radiation source 402 may include a first (or bottom) mirror 410 and a second (or top) mirror 412 stacked on (e.g., formed on) a semiconductor substrate 414. The first and second mirrors 410, 412 may have reflective surfaces that face one another to form a resonant cavity 416 therebetween. The second mirror 412 may be partially transmissive, and may 1) allow a portion of the electromagnetic radiation generated by the electromagnetic radiation source 402 to escape the radiation source 402, and 2) allow a portion of the electromagnetic radiation redirected (e.g., reflected or scattered) from the circumference 216 of the shaft 206 to re-enter the resonant cavity of the electromagnetic radiation source 402. In some embodiments, the second mirror's transmissivity to the wavelength of electromagnetic radiation generated/received by the electromagnetic radiation source 402 may be about 1%, although higher or lower transmissivities may be used. The first mirror 410 may also be partially transmissive to the wavelength of electromagnetic radiation generated/received by the electromagnetic radiation source 402, but in some embodiments may be less transmissive than the second mirror 412.

By way of example, the electromagnetic radiation source 402 may be a VCSEL having a top-emitting configuration. In other embodiments, the electromagnetic radiation source 402 may be a VCSEL having a bottom-emitting configuration. In a bottom-emitting configuration, a VCSEL may have optical elements etched to its bottom substrate to change the light emitted by the VCSEL. In some cases, the optical elements may be used to adjust the divergence of light emitted by the VCSEL.

The resonant cavity 416 may be electrically or optically pumped to generate electromagnetic radiation (e.g., light), and a gain material within the resonant cavity 416 may amplify the electromagnetic radiation that reflects within the resonant cavity 416 (e.g., the gain material may receive x photons and emit y photons, with $y \geq x$). When pumped to generate electromagnetic radiation, a current (I) may flow through the electromagnetic radiation source 402. The portion of the emitted electromagnetic radiation that is redirected from the circumference 216 of the shaft 206, and that re-enters the electromagnetic radiation source 402, is coherent with the electromagnetic radiation that is generated by the electromagnetic radiation source 402, and interacts (mixes) with the generated electromagnetic radiation coherently. However, the electromagnetic radiation that re-enters the electromagnetic radiation source 402 may have a phase delay with respect to the electromagnetic radiation that is generated by the electromagnetic radiation source 402. The coherent mixing of generated and redirected electromagnetic radiation within the resonant cavity therefore produces an interference signal that modulates the beam of electromagnetic radiation 404 emitted by the electromagnetic radiation source 402. For example, if the nominal power of the beam of electromagnetic radiation 404 is one Watt (1 W), the actual power of the beam of electromagnetic radiation 404 may vary between 0.999 W and 1.001 W due to the coherent mixing of generated and redirected electromagnetic radiation within the electromagnetic radiation source 402. The modulation in power (or interference signal) carries information about the movement and/or position of the crown 202.

The afore-mentioned change in power happens as the threshold power of the electromagnetic radiation source 402 is modulated. For the same reason, the junction voltage of the electromagnetic radiation source 402 changes when it is driven with a constant bias current, or the current passing through the electromagnetic radiation source 402 changes when the electromagnetic radiation source 402 is driven with a constant voltage.

The interference signal created by the coherent mixing of generated and redirected light may be measured by a sensor, such as an electrical sensor or an optoelectronic sensor. As an example, FIG. 4 shows an electrical sensor (e.g., a voltage sensor 418) coupled to the electromagnetic radiation source 402 (e.g., a VCSEL) to monitor a junction voltage (V) of the electromagnetic radiation source 402. Measurement of the junction voltage provides an indirect measurement of the power of the beam of electromagnetic radiation 404, because the junction voltage modulates in response to the coherent mixing of electromagnetic radiation within the electromagnetic radiation source 402.

In some embodiments, the sensor system 400 may be mounted within a module 420 having an open or covered aperture 422.

Figure 5A:
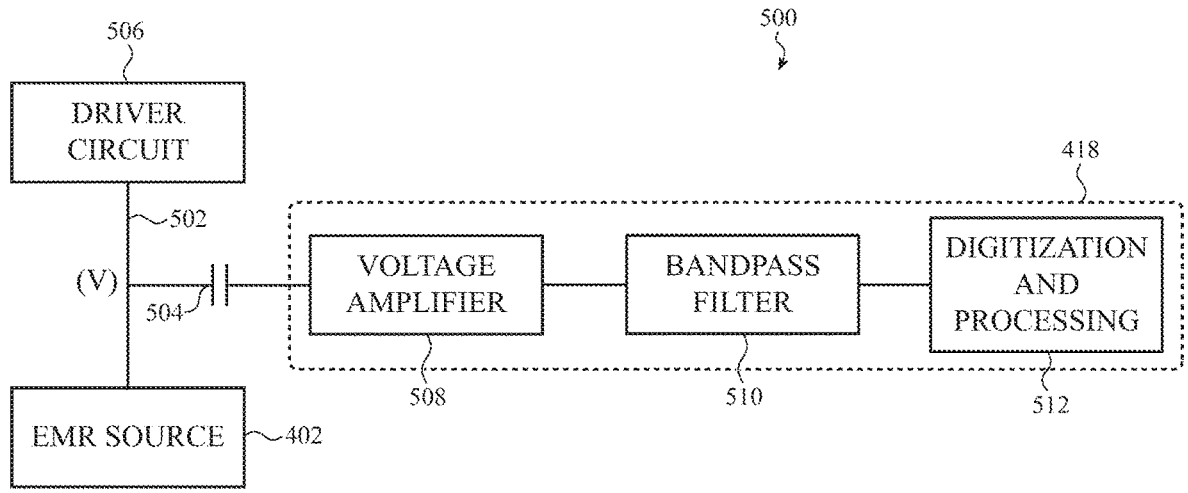
FIGS. 5A-5C is a block diagram showing examples of the voltage sensor described with reference to FIG. 4.

FIG. 5A is a block diagram 500 showing an example of the voltage sensor 418 described with reference to FIG. 4. As shown, the voltage sensor 418 may be capacitively coupled (e.g., AC-coupled, as illustrated by capacitor 504) to a junction 502 between the electromagnetic radiation source 402 and a constant current driver circuit 506, and may sense the modulated voltage (V) of the junction 502 while removing the DC component of the junction voltage. Alternatively, the voltage sensor 418 may be DC-coupled to the junction 502. The voltage sensor 418 may include, for example, a voltage amplifier 508, a bandpass filter 510, digitization and processing circuitry 512 (e.g., an analog-to-digital converter (ADC) and processor), and/or other components. By way of example, the voltage amplifier 508 may include a single-stage low-noise amplifier or a multi-stage low-noise amplifier. In some cases, the bandpass filter 510 may be replaced with a low-pass filter or a high-pass filter. The digitization and processing circuitry 512 may compute an FFT of an interference signal obtained from the junction voltage, and may determine a velocity from the FFT (e.g., from a Doppler frequency). Alternatively, the digitization and processing circuitry 512 (or voltage sensor 418 as a whole) may characterize watch crown movement using time-domain processing.

Figure 5B:
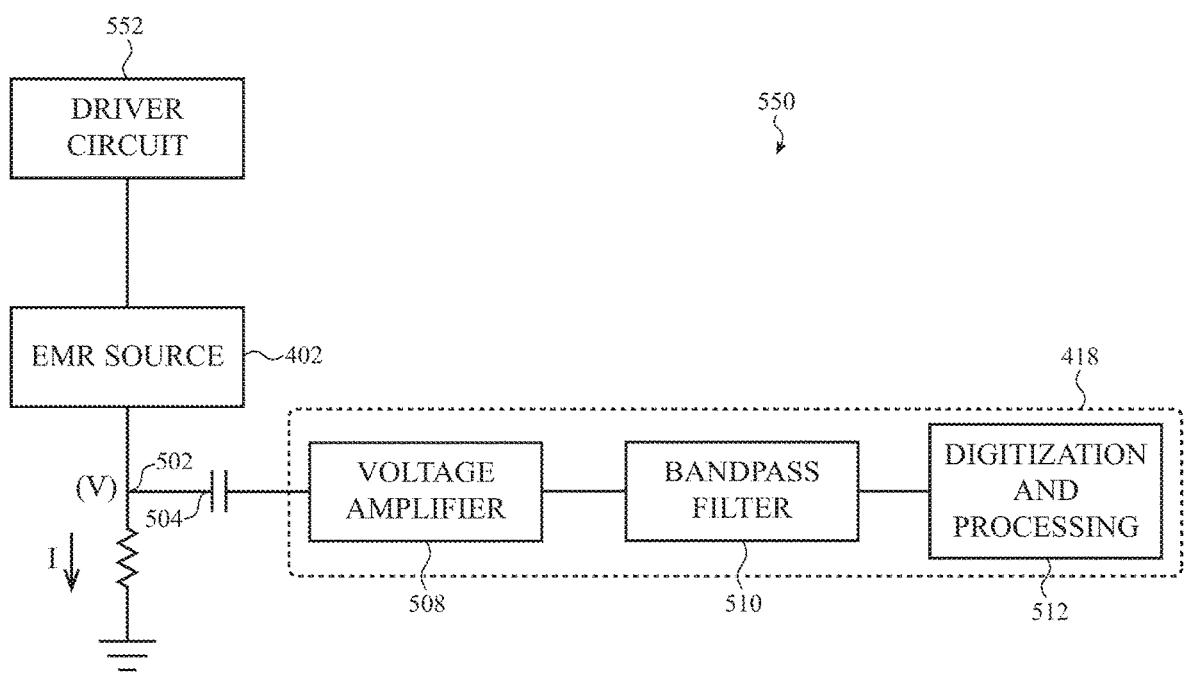

FIG. 5B is a block diagram 550 showing another example of the voltage sensor 418 described with reference to FIG. 4. As shown, the voltage sensor 418 may be capacitively coupled (e.g., AC-coupled, as illustrated by capacitor 504) to a junction 502 between the electromagnetic radiation source 402 and a resistor (R). The electromagnetic radiation source 402 may be driven by a constant voltage driver circuit 552, and the voltage sensor 418 may sense a modulated voltage (V) across the resistor R, which modulated voltage corresponds to the current (I) flowing through the electromagnetic radiation source 402. Alternatively, the voltage sensor 418 may be DC-coupled to the junction 502. The voltage sensor 418 may include components that are the same as (or similar to) those described with reference to FIG. 5A.

Figure 5C:
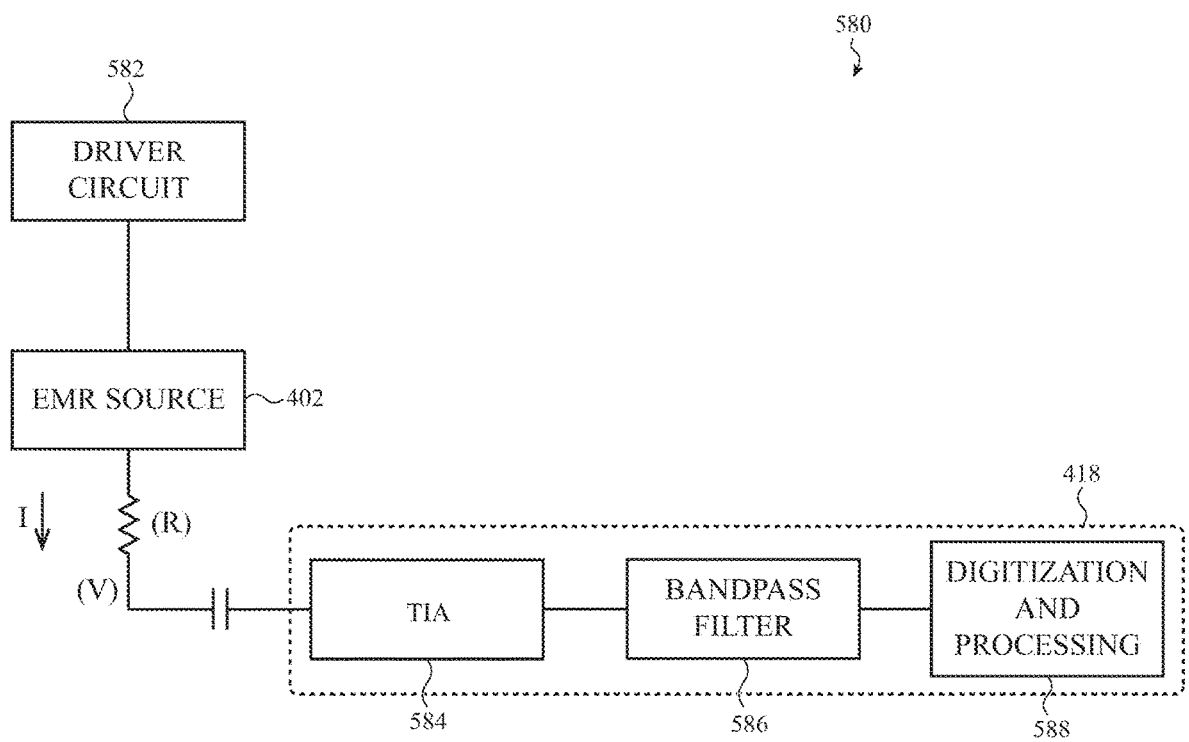

FIG. 5C is a block diagram 580 showing another example of the voltage sensor 418 described with reference to FIG. 4. As shown, the voltage sensor 418 may be capacitively coupled (e.g., AC-coupled, as illustrated by capacitor 504) to one terminal of a resistor (R) coupled between the voltage sensor 418 and the electromagnetic radiation source 402. The electromagnetic radiation source 402 may be driven by a constant voltage driver circuit 582, and the voltage sensor 418 may sense a modulated voltage (V) across the resistor R, which modulated voltage corresponds to the current (I) flowing through the electromagnetic radiation source 402. Alternatively, the voltage sensor 418 may be DC-coupled to the resistor R. The voltage sensor 418 may include, for example, a transimpedance amplifier (TIA) 584, a bandpass filter 586, digitization and processing circuitry 588 (e.g., an ADC and processor), and/or other components. In some cases, the bandpass filter 586 may be replaced with a low-pass filter or a high-pass filter. The digitization and processing circuitry 588 may compute an FFT of an interference signal obtained from the current flowing through the electromagnetic radiation source 402, and may determine a velocity from the FFT (e.g., from a Doppler frequency). Alternatively, the digitization and processing circuitry 588 (or voltage sensor 418 as a whole) may characterize watch crown movement using time-domain processing.

Figure 6:
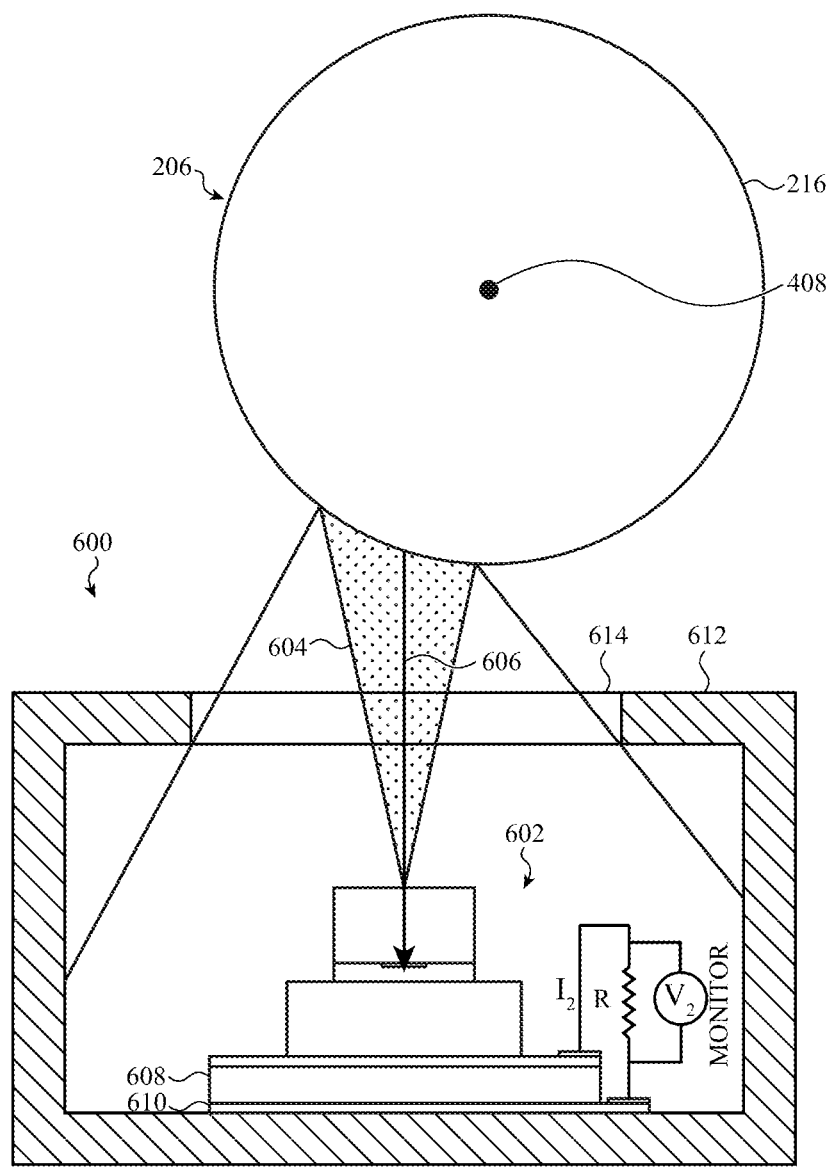
FIG. 6 shows a second embodiment of a sensor system such as the sensor system described with reference to FIG. 2.

FIG. 6 shows a second embodiment of a sensor system such as the sensor system 204 described with reference to FIG. 2. The embodiment is illustrated with respect to a cross-section of the shaft 206 of the crown 202. The sensor system 600 may include an electromagnetic radiation source 602 positioned to emit a beam of electromagnetic radiation 604 toward the circumference 216 of the shaft 206. The beam of electromagnetic radiation 604 may depend on a coherent mixing of electromagnetic radiation within a resonant cavity of the electromagnetic radiation source 602. The coherent mixing of electromagnetic radiation may include a mixing of a first amount of electromagnetic radiation generated by the electromagnetic radiation source 602, and a second amount of electromagnetic radiation redirected (e.g., reflected or scattered) from the circumference 216 of the shaft 206 into the electromagnetic radiation source 602 (e.g., into a resonant cavity of the electromagnetic radiation source 602). The electromagnetic radiation source 602 may be configured similarly to the electromagnetic radiation source 402 described with reference to FIG. 4, and the beam of electromagnetic radiation 604 emitted by the electromagnetic radiation source 602 may have an axis 606 oriented similar to the axis 406 of the beam of electromagnetic radiation 404 described with reference to FIG. 4. However, the electromagnetic radiation source 602 may be stacked together or integrated with (e.g., stacked on, or formed during a wafer process flow with) a photodetector 608 (e.g., the photodetector 608 may be formed on a semiconductor substrate 610, and the electromagnetic radiation source 602 may be formed above the photodetector 608, or the photodetector 608 may be formed in a first set of layers, and the electromagnetic radiation source 602 may be formed in a second set of layers, during a same wafer process flow). When the photodetector 608 and electromagnetic radiation source 602 are formed during the same wafer process flow, the wafer-level processing steps to form the photodetector 608 may occur before, after, or intermingled with the wafer-level processing steps to form the electromagnetic radiation source 602.

The photodetector 608 may generate an interference signal (e.g., a current, $I_2$) that modulates based on parameters of the beam of electromagnetic radiation 604. The interference signal (current $I_2$) may be sensed, for example, by sensing a voltage ($V_2$) across a resistance (R) through which the current $I_2$ flows. Alternatively, $I_2$ can be input to a transimpedance amplifier (TIA) and converted to a sensing voltage, as described with reference to FIG. 7.

In some embodiments, the sensor system 600 may be mounted within a module 612 having an open or covered aperture 614.

Figure 7:
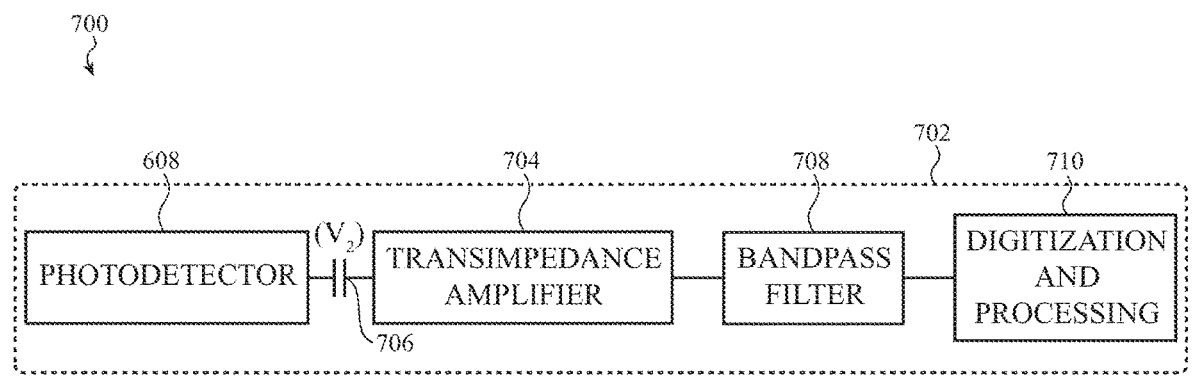
FIG. 7 is a block diagram showing an example of an optoelectronic sensor including the photodetector described with reference to FIG. 6.

FIG. 7 is a block diagram 700 showing an example of an optoelectronic sensor 702 including the photodetector 608 described with reference to FIG. 6. As shown, a TIA 704 may be capacitively coupled (illustrated by capacitor 706) to the photodetector 608, and may sense the modulated voltage ($V_2$) while removing the DC component of the voltage $V_2$. Alternatively, the photodetector 608 may be DC-coupled to the TIA 704. The optoelectronic sensor 702 may further include, for example, a bandpass filter 708, digitization and processing circuitry 710 (e.g., an ADC and processor), and/or other components. In some cases, the bandpass filter 708 may be replaced with a low-pass filter or a high-pass filter. The digitization and processing circuitry 710 may compute an FFT of an interference signal obtained from the photodetector 608, and may determine a velocity from the FFT (e.g., from a Doppler frequency). Alternatively, the digitization and processing circuitry 710 (or optoelectronic sensor 702 as a whole) may characterize watch crown movement using time-domain processing.

Figure 8:
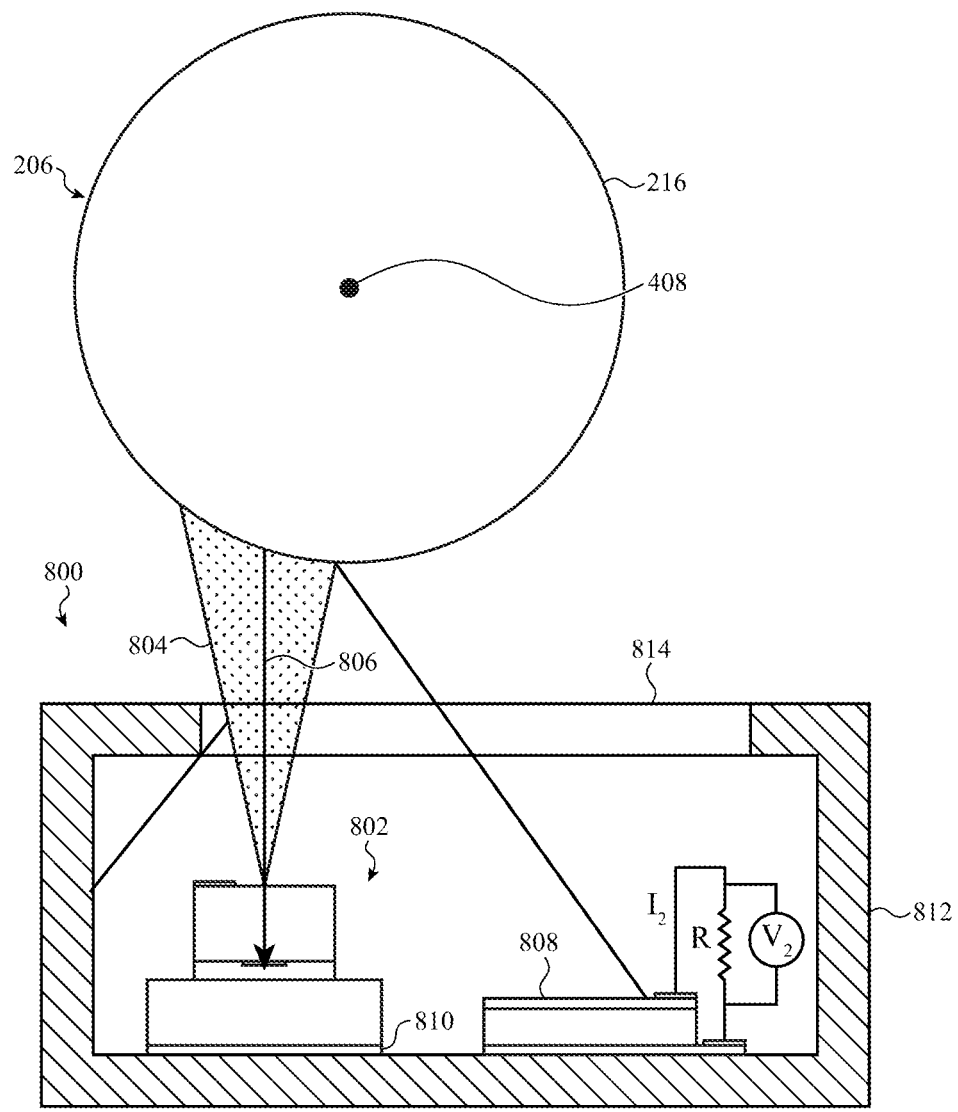
FIG. 8 shows a third embodiment of a sensor system such as the sensor system described with reference to FIG. 2.

FIG. 8 shows a third embodiment of a sensor system such as the sensor system 204 described with reference to FIG. 2.

The embodiment is illustrated with respect to a cross-section of the shaft 206 of the crown 202. The sensor system 800 may include an electromagnetic radiation source 802 positioned to emit a beam of electromagnetic radiation 804 toward the circumference 216 of the shaft 206. The beam of electromagnetic radiation 804 may depend on a coherent mixing of electromagnetic radiation within a resonant cavity of the electromagnetic radiation source 802. The coherent mixing of electromagnetic radiation may include a mixing of a first amount of electromagnetic radiation generated by the electromagnetic radiation source 802, and a second amount of electromagnetic radiation redirected (e.g., reflected or scattered) from the circumference 216 of the shaft 206 into the electromagnetic radiation source 802 (e.g., into a resonant cavity of the electromagnetic radiation source 802). The electromagnetic radiation source 802 may be configured similarly to the electromagnetic radiation source 402 described with reference to FIG. 4, and the beam of electromagnetic radiation 804 emitted by the electromagnetic radiation source 802 may have an axis 806 oriented similar to the axis 406 of the beam of electromagnetic radiation 404 described with reference to FIG. 4. However, the electromagnetic radiation source 802 may be positioned adjacent a photodetector 808 (e.g., the photodetector 808 and the electromagnetic radiation source 802 may be formed adjacent one another on a semiconductor substrate 810).

The photodetector 808 may generate an interference signal (e.g., a current, $I_2$) that modulates based on parameters of the beam of electromagnetic radiation 804. The interference signal (current $I_2$) may be sensed as described with reference to FIGS. 6 and 7. In some embodiments, the photodetector 808 may monitor the output power of the beam of electromagnetic radiation 804 and generate the interference signal in response to specular reflection, of the generated beam of electromagnetic radiation 804, from an optical element positioned within the aperture 814.

In some embodiments, the sensor system 800 may be mounted within a module 812 having an open or covered aperture 814.

Figure 9:
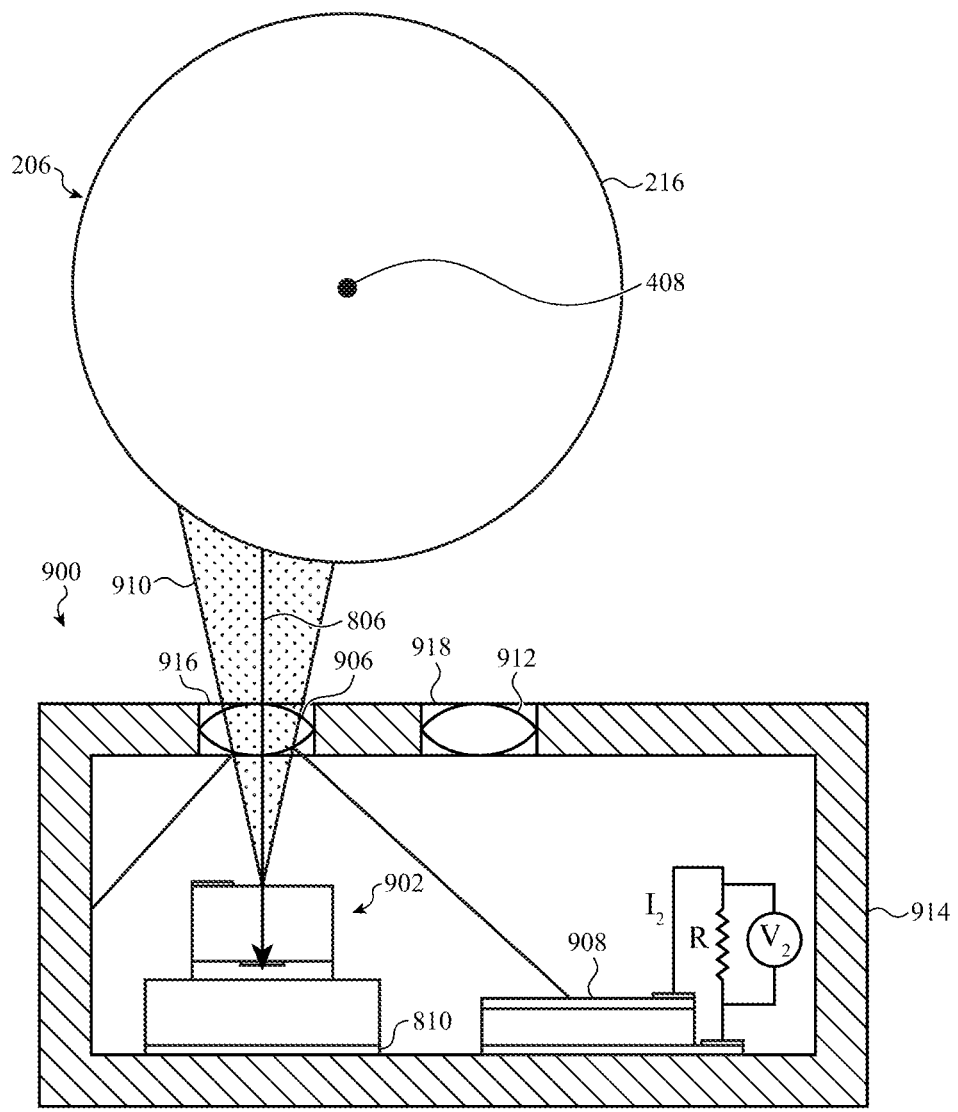
FIG. 9 shows a fourth embodiment of a sensor system, such as the sensor system described with reference to FIG. 2, in which one or more optical components are positioned between an electromagnetic radiation source and a watch crown surface.

In some embodiments, and as shown in FIG. 9 (which in some cases may be a fourth embodiment of the sensor system 204 described with reference to FIG. 2), one or more optical components (e.g., a lens 906 or other optical element having one or more reflective, refractive, or diffractive optical surfaces) may be positioned between an electromagnetic radiation source 902 and a watch crown surface 904. For example, a lens 906 may be positioned on or over a light-emitting aperture of the electromagnetic radiation source 902. Alternatively or additionally, in embodiments in which an adjacent photodetector 908 is used to sense parameters of a beam of electromagnetic radiation 910 emitted by the electromagnetic radiation source 902 and redirected (e.g., reflected or scattered) by the watch crown surface 904, one or more optical components (e.g., a lens 912 or other optical element having one or more reflective, refractive, or diffractive optical surfaces) may be positioned between the watch crown surface 904 and the photodetector 908. For example, a lens 912 may be positioned on or over a light-receiving surface of the photodetector 908. The lens 906 and/or other optical components positioned between the electromagnetic radiation source 902 and the watch crown surface 904 may change the direction of the beam of electromagnetic radiation 910 emitted by the electromagnetic radiation source 902, or change the direction of electromagnetic radiation redirected by the watch crown surface 904 and re-entering the electromagnetic radiation source 902. The lens 906 and/or other optical components may also help to collimate or focus electromagnetic radiation (e.g., light), or filter out wavelengths of electromagnetic radiation other than a particular wavelength of electromagnetic radiation emitted by the electromagnetic radiation source 902. In some cases, a lens 906 or other optical component may be formed directly on the electromagnetic radiation source 902 using semiconductor processing or die encapsulation techniques.

In embodiments including the photodetector 908, the photodetector 908 may sense electromagnetic radiation redirected from the lens 906, or electromagnetic radiation redirected from the watch crown surface 904 through the lens 912, or a combination of both to monitor the output power of the beam of electromagnetic radiation 910 emitted by the electromagnetic radiation source 902 and generate an interference signal.

The lens 912 and/or other optical components positioned between the watch crown surface 904 and the photodetector 908 may change the direction of, collimate, or focus electromagnetic radiation redirected (e.g., reflected or scattered) by the watch crown surface 904, to increase the amount of electromagnetic radiation received by the photodetector 908 (e.g., to improve electromagnetic radiation (e.g., light) collection efficiency). The lens 912 and/or other optical components may also filter out wavelengths of electromagnetic radiation other than a particular wavelength of electromagnetic radiation emitted by the electromagnetic radiation source 902. In some cases, a lens 912 or other optical component may be formed directly on the photodetector 908 using semiconductor processing or die encapsulation techniques.

The lens 906 or 912 may also be used to control the spectral spread of a particular wavelength or wavelengths of electromagnetic radiation in the frequency domain. The Doppler frequency of the electromagnetic radiation is proportional to the cosine of an angle between the beam of electromagnetic radiation and the surface tangent of the watch crown surface 904. The lens 906 or 912 may therefore be configured to stabilize this angle over the area of illumination and, therefore, the width of the Doppler frequency peak may be minimized, improving the SNR.

The lens 906 or 912 may be positioned on-axis or off-axis with respect to the electromagnetic radiation source 902 or photodetector 908.

In some embodiments, the sensor system 900 may be mounted within a module 914 having one or more apertures 916, 918 in which the lenses 906, 912 are mounted.

Figure 10:
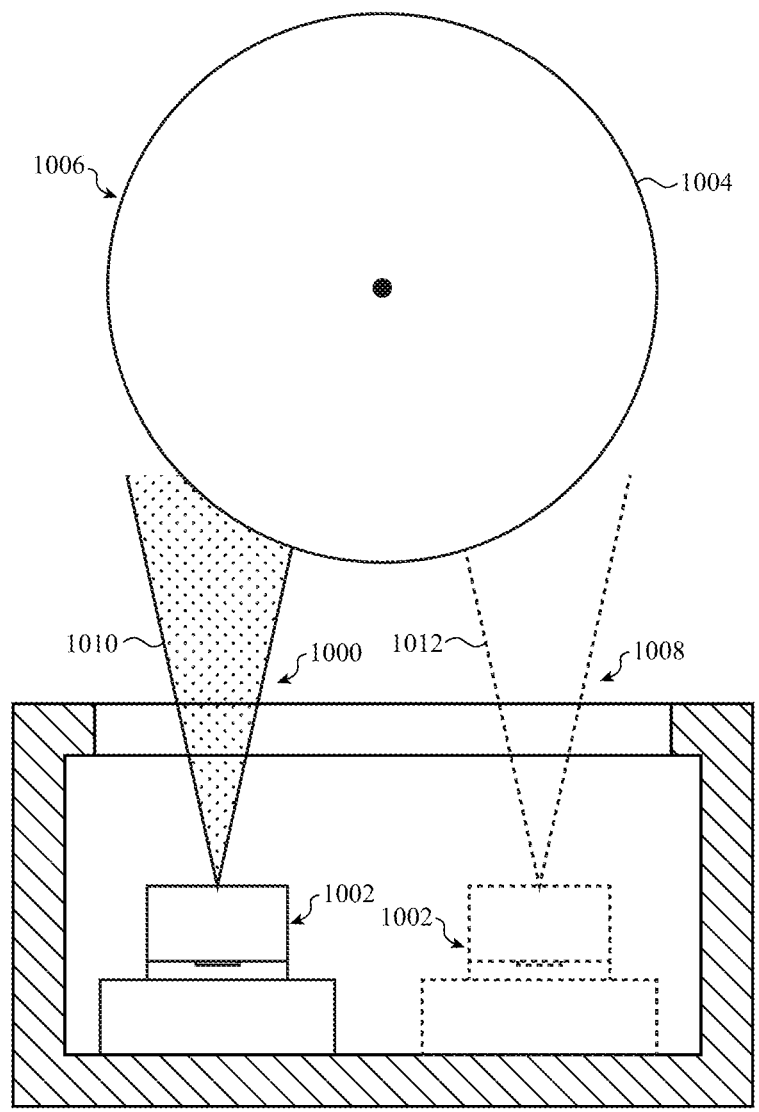
FIG. 10 shows intended and unintended alignments of a sensor system with respect to a watch crown surface (e.g., a circumference of a crown shaft)

When an electromagnetic radiation source is used to illuminate a watch crown surface and perform coherent mixing of generated/received electromagnetic radiation, the parameters of the beam of electromagnetic radiation measured by a sensor may vary based on the position or orientation of a sensor system with respect to the watch crown surface. For example, the Doppler frequency shift is a function of the cosine of an angle between the beam of electromagnetic radiation and a surface tangent of a watch crown surface. FIG. 10 shows an intended alignment 1000 (or nominal alignment) of a sensor system 1002 with respect to a watch crown surface (e.g., a circumference 1004 of a shaft 1006) in solid lines, and shows an unintended alignment 1008 of the sensor system 1002 with respect to the circumference 1004 of the shaft 1006 in broken lines.

A beam of electromagnetic radiation 1010 emitted by the sensor system 1002 when the sensor system 1002 has the intended alignment 1000 may intersect a first portion of the circumference 1004 at a first distance and a first angle of incidence. A beam of electromagnetic radiation 1012 emitted by the sensor system 1002 when the sensor system 1002 has the unintended alignment 1008 may intersect a second portion of the circumference 1004 at a second distance and a second angle of incidence (different from the first distance and/or second angle of incidence). The unintended alignment 1008 of the sensor system 1002 may therefore change the phase shift, frequency shift, or other parameters of redirected electromagnetic radiation, and may introduce errors (e.g., angle errors or gain errors) that cause a processor to identify an incorrect speed of rotation of the crown or shaft 1006.

Although not specifically shown in FIG. 10, an unintended alignment of the sensor system 1002 with respect to the watch crown surface may also result from an unintended alignment of a module 1014 that includes the sensor system 1002, resulting in a module-to-crown misalignment, or from a tilt of the crown or its shaft 1006 (e.g., a tilt of the shaft 1006 along an axis that is out-of-plane with respect to the two-dimensional view shown in FIG. 10).

In the next set of embodiments, a sensor system includes multiple electromagnetic radiation sources having a predetermined relationship (e.g., two electromagnetic radiation sources that are formed or mounted on a substrate with a predetermined spacing and orientation therebetween), and signals generated by the multiple electromagnetic radiation sources may be used in combination to factor out assembly tolerances (e.g., particular misalignments of the sensor system with respect to the watch crown surface).

Figure 11:
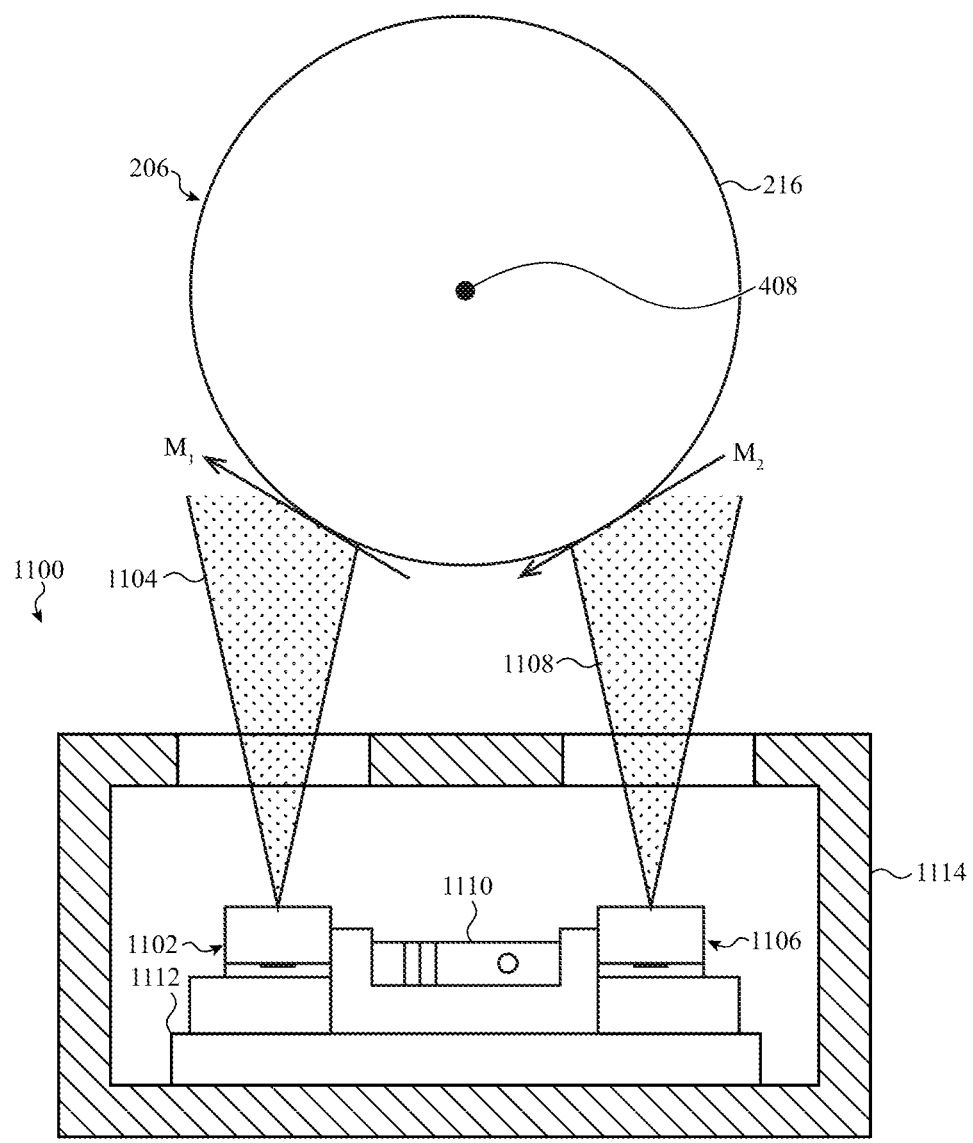
FIG. 11 shows a fifth embodiment of a sensor system such as the sensor system described with reference to FIG. 2.

FIG. 11 shows a fifth embodiment of a sensor system such as the sensor system 204 described with reference to FIG. 2. The embodiment is illustrated with respect to a cross-section of the shaft 206 of the crown 202. The sensor system 1100 may include a first electromagnetic radiation source 1102 configured to emit a first beam of electromagnetic radiation 1104 toward the circumference 216 of the shaft 206, and a second electromagnetic radiation source 1106) configured to emit a second beam of electromagnetic radiation 1108 toward the circumference 216 of the shaft 206. Each beam of electromagnetic radiation 1104, 1108 may depend on a coherent mixing of electromagnetic radiation within a first resonant cavity of the first electromagnetic radiation source 1102 or a second resonant cavity of the second electromagnetic radiation source 1106. The coherent mixing of electromagnetic radiation within each of the first resonant cavity and the second resonant cavity may include a mixing of a first amount of electromagnetic radiation generated by the first electromagnetic radiation source 1102 or the second electromagnetic radiation source 1106 and a second amount of electromagnetic radiation redirected into the first resonant cavity or the second resonant cavity from the circumference 216 of the shaft 206. Each of the first electromagnetic radiation source 1102 and the second electromagnetic radiation source 1106 may be configured similarly to any of the electromagnetic radiation sources described with reference to FIG. 4, 6, 8, or 9. A set of one or more sensors 1110 may be associated with each electromagnetic radiation source 1102 or 1106 (e.g., as a circuit that monitors a junction voltage or bias current of the electromagnetic radiation source 1102 or 1106, or as a photodetector stacked together or monolithically integrated with the electromagnetic radiation source 1102 or 1106), or be configured as a photodetector positioned adjacent each electromagnetic radiation source 1102 or 1106. In FIG. 11, and by way of example, the set of one or more sensors 1110 is presumed to include a circuit (e.g., a voltage sensor) that monitors a junction voltage of each electromagnetic radiation source 1102, 1106.

The electromagnetic radiation sources 1102, 1106 may be formed on a common substrate 1112, with a predetermined spacing and orientation therebetween. In operation, the electromagnetic radiation sources 1102, 1106 may emit electromagnetic radiation toward (e.g., illuminate) different portions of the shaft 206 having different slopes (e.g., slopes $M_1$ and $M_2$). However, a change in the illuminated portions of the shaft 206 due to misalignment of the sensor system 1100 with respect to the shaft 206 may be compensated for using 1) the known spacing and orientation between the electromagnetic radiation sources 1102, 1106, in combination with 2) parameters of the beams of electromagnetic radiation 1104, 1108 (which beams of electromagnetic radiation 1104, 1108 modulate as a result of coherent mixing of electromagnetic radiation within the resonant cavities of the electromagnetic radiation sources 1102, 1106, and modulate differently based on which portions of the shaft 206 are illuminated by the electromagnetic radiation sources 1102, 1106). The electromagnetic radiation sources 1102 and 1106 may emit beams of electromagnetic radiation at the same time or at different times (e.g., in a time-multiplexed manner that can mitigate or prevent cross-talk).

In some cases, a change in the illuminated portions of the shaft 206, due to misalignment of the sensor system 1100 with respect to the shaft 206, may also or alternatively be compensated for by combining the interference signals generated by the first and second electromagnetic radiation sources 1102, 1106 or combining computations based thereon. For example, a speed of rotation ($\bar{v}$) of the shaft 206 may be computed by averaging a first speed of rotation ($\bar{v}_A$) computed using measurements of the first beam of electromagnetic radiation 1104 and a second speed of rotation ($\bar{v}_B$) computed using measurements of the second beam of electromagnetic radiation 1108:

$$\bar{v} = \frac{\bar{v}_A - \bar{v}_B}{2}$$

In the above equation, the first and second beams of electromagnetic radiation 1104, 1108 are presumed to intersect the circumference 216 of the shaft 206 at positive and negative angles of incidence, such that $\bar{v}_A$ and $\bar{v}_B$ have opposite signs.

More complicated compensation equations can also be derived and used by calculating the change in $M_1$ and $M_2$ (and therefore the change in speed/velocity estimations $\bar{v}_A$ and $\bar{v}_B$) as a function of the misalignment of the electromagnetic radiation sources 1102, 1106 from nominal. Such equations generally depend on the nominal values of $M_1$ and $M_2$.

Figure 12:
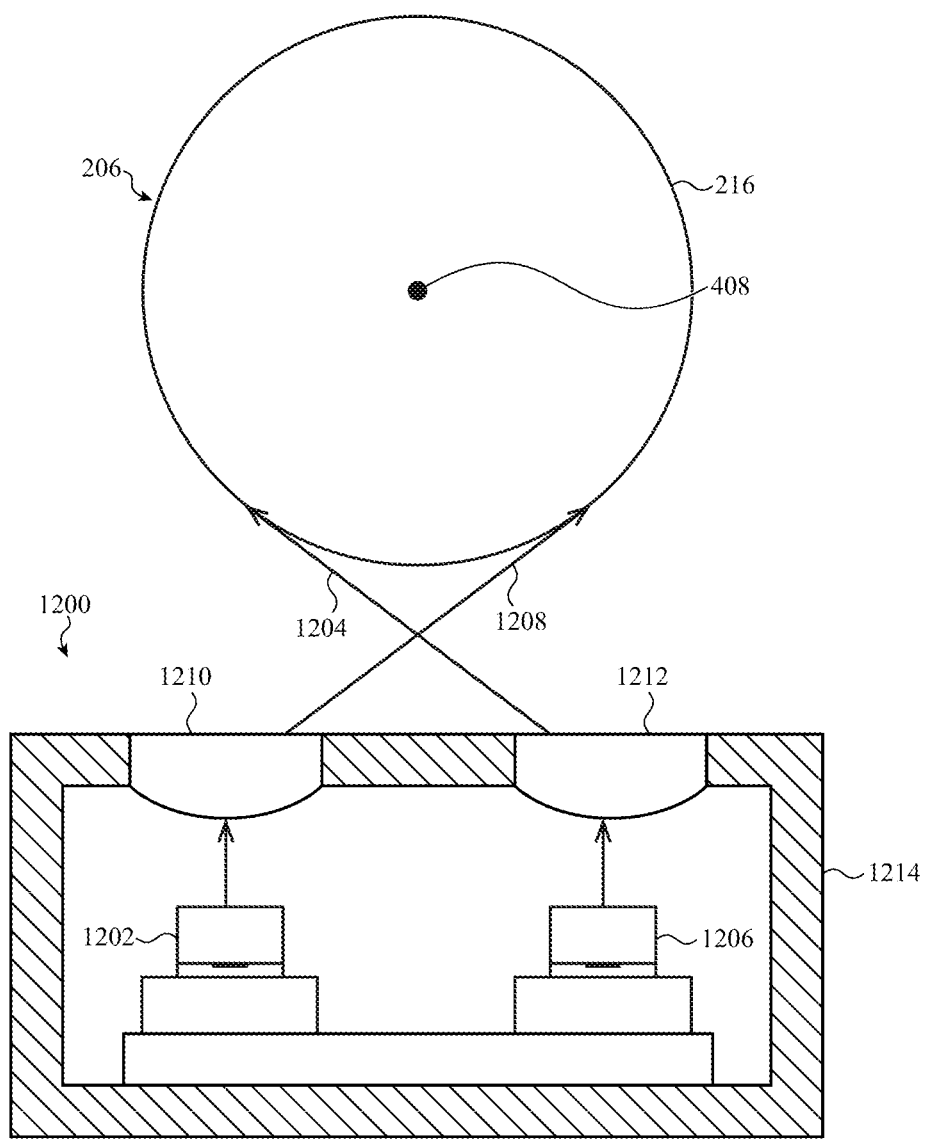
FIG. 12 shows a sixth embodiment of a sensor system such as the sensor system described with reference to FIG. 2.

FIG. 12 shows a sixth embodiment of a sensor system such as the sensor system 204 described with reference to FIG. 2. The embodiment is illustrated with respect to a cross-section of the shaft 206 of the crown 202. The sensor system 1200 is similar to the sensor system 1100 described with reference to FIG. 11 and may include a first electromagnetic radiation source 1202 configured to emit a first beam of electromagnetic radiation 1204 toward the circumference 216 of the shaft 206, and a second electromagnetic radiation source 1206 configured to emit a second beam of electromagnetic radiation 1208 toward the circumference 216 of the shaft 206. However, a lens 1210 or other optical element(s) may be mounted between the first electromagnetic radiation source 1202 and the shaft 206, and/or a lens 1212 or other optical element(s) may be mounted between the second electromagnetic radiation source 1206 and the shaft 206. In some cases, a lens or other optical element (e.g., the lens 1210 or 1212) may redirect the beam of electromagnetic radiation 1204 or 1208 emitted by the electromagnetic radiation source 1202 or 1206, or redirect, collimate, or focus light reflected or scattered by the circumference 216 of the shaft 206 for reception back into the electromagnetic radiation source 1202 or 1206. As an example, the lenses 1210, 1212 shown in FIG. 12 redirect the beams of electromagnetic radiation 1204, 1208 emitted by the first and second electromagnetic radiation sources 1202, 1206 and cause the beams to cross before they illuminate different portions of the circumference 216 of the shaft 206. In other embodiments, the beams of electromagnetic radiation 1204, 1208 may be redirected but not cross.

In some embodiments, the lens 1210 or 1212 may filter electromagnetic radiation (e.g., light) and allow only the wavelength of electromagnetic radiation emitted by the electromagnetic radiation source 1202 or 1206 (or a small range of wavelengths) to pass.

The sensor system 1100 or 1200 may be relatively wide in a direction transverse to the axis 408 of the shaft 206, but relatively thin in a direction parallel to the axis 408 of the shaft 206. In some embodiments, the sensor system 1100 or 1200 may be mounted within a module housing 1114 or 1214. In some embodiments, the module housing 1114 or 1214 may be substantially non-reflective (or less reflective than the circumference 216 of the shaft 206). The module housing 1114 may have a pair of openings or windows through which the beams of electromagnetic radiation 1104, 1108 pass. The module housing 1214 may have the lenses 1210 and 1212 mounted within openings therein.

Figure 13:
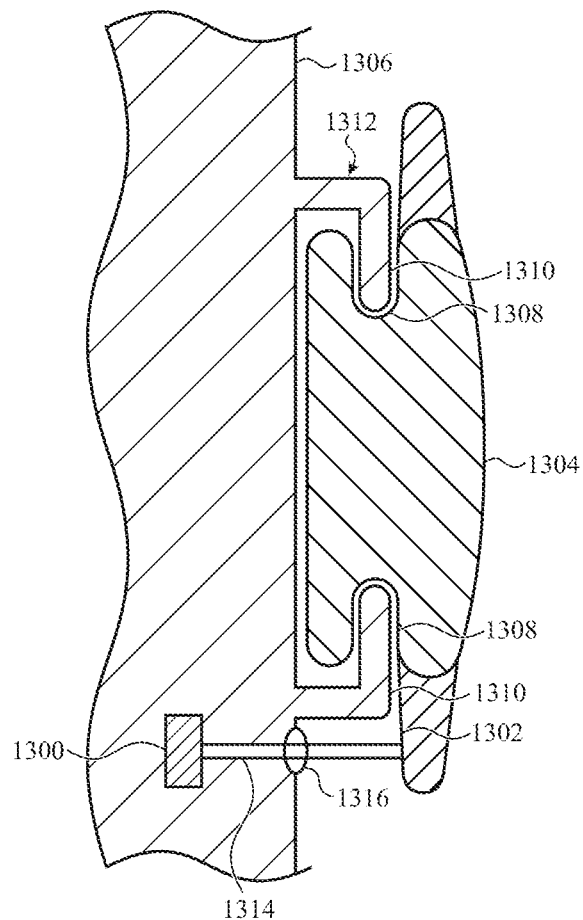
FIG. 13 shows an embodiment of a sensor system positioned to illuminate a surface of a crown cap.

FIG. 13 shows an embodiment of a sensor system 1300 positioned to illuminate a surface 1302 of a crown cap 1304. The crown cap 1304 may or may not be attached to a shaft that extends through a housing 1306 of a watch body (e.g., in some embodiments, an entirety of a watch crown may be positioned external to the housing 1306, and in some embodiments, the watch crown may only include the crown cap 1304). By way of example, the crown cap 1304 is not attached to a shaft, but is coupled to the housing 1306 by a circumferential groove 1308 on the crown cap 1304 that receives a circumferential ridge 1310 within a crown cap retainer 1312 affixed to the housing 1306. In alternate embodiments, the ridge may be formed on the crown cap 1304 and the groove may be formed in the crown cap retainer 1312, or the crown cap 1304 may be retained by a crown cap retainer in other ways. The crown cap retainer 1312 may be an integral part of the housing 1306, or may be permanently or semi-permanently mounted to the housing 1306.

The sensor system 1300 may be mounted within the housing 1306. The sensor system 1300 may include an electromagnetic radiation source that emits a beam of electromagnetic radiation 1314 toward a surface 1302 of the crown cap 1304 facing the housing 1306. The beam of electromagnetic radiation 1314 may pass through an opening 1316 in the housing 1306. The opening 1316 may be covered by a cover, lens, or other optical component that is transparent to at least a wavelength of electromagnetic radiation emitted by the electromagnetic radiation source. In some embodiments, the housing 1306 may not include the opening, but may be formed of a material that is transparent to at least a wavelength of electromagnetic radiation emitted by the electromagnetic radiation source. In some embodiments, the housing 1306 or optical component through which the beam of electromagnetic radiation 1314 passes may be coated with an ink or film that matches or coordinates with a color of the watch body and passes at least a wavelength of electromagnetic radiation emitted by the electromagnetic radiation source.

In some embodiments, the axis of the beam of electromagnetic radiation 1314 may intersect the surface 1302 of the crown cap 1304 at an angle other than 90 degrees (e.g., at an acute angle). In alternatives to the embodiment shown in FIG. 13, a shaft may be attached to the crown cap 1304, and a sensor system may emit electromagnetic radiation toward an end of the shaft (as discussed with reference to FIG. 3), or the shaft may include a disc or larger diameter portion having a surface that extends radially from the shaft, and a sensor system may emit electromagnetic radiation toward a surface of the disc or larger diameter portion.

FIGS. 14-19 illustrate coherent mixing of electromagnetic radiation within a resonant cavity of an electromagnetic radiation source alters (modulates) the power of a beam of electromagnetic radiation emitted by the electromagnetic radiation source, thereby providing an interference signal.

Figure 14:
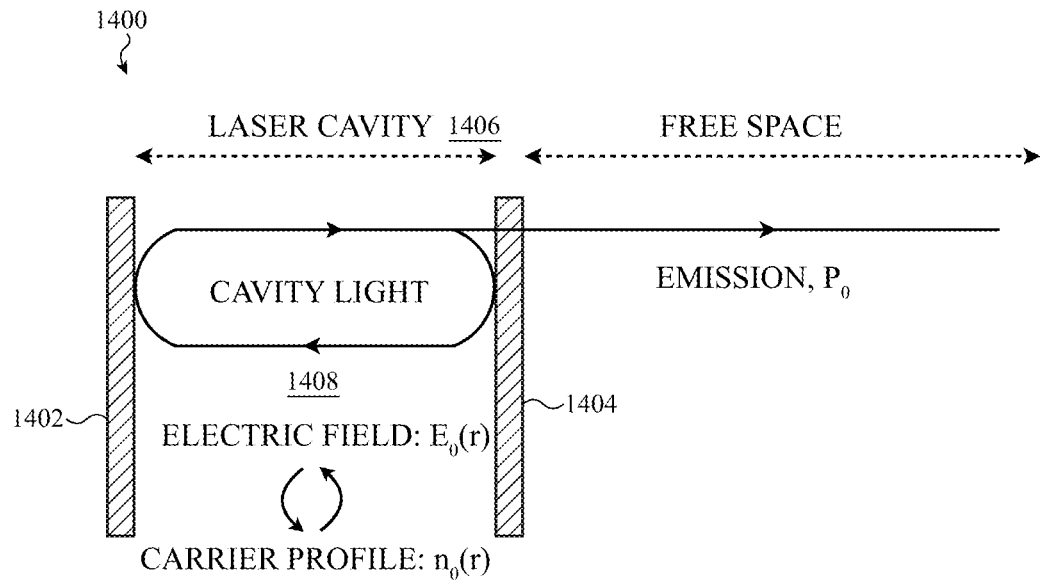
FIGS. 14-19 illustrate coherent mixing of electromagnetic radiation within an electromagnetic radiation source alters (modulates) the optical power of a beam of electromagnetic radiation emitted by the electromagnetic radiation source, providing an interference signal.

As shown in FIG. 14, an electromagnetic radiation source 1400 may include a first mirror 1402 and a second mirror 1404 defining opposite ends of a resonant cavity 1406. Each mirror may include a plurality of layers of material defining a distributed Bragg reflector (e.g., a set of layers having alternating high and low refractive indices). Electromagnetic radiation generated by the electromagnetic radiation source 1400 reflects between the mirrors 1402, 1404 and is amplified as it passes through an optical gain material 1408 (a quantum well) between the mirrors 1402, 1404. The gain material may include multiple doped layers of III-V semiconductors (i.e., layers from the third row of the periodic table, and layers from the fifth row of the periodic table). In one example, the gain material may include aluminum-gallium-arsenide (AlGaAs), indium-gallium-arsenide (InGaAs), or gallium-arsenide (GaAs).

The electromagnetic radiation within the resonant cavity 1406 is: coherent (i.e., all photons in the light have a same frequency (i.e., same wavelength, k) and phase), has an electric field $E_0(r)$, and has a carrier profile $n_0(r)$. The electrical field at any point within the resonant cavity 1406 is a function (cosine function) of the distance between the mirrors 1402, 1404. The electrical field at each mirror 1402, 1404 is zero. The resonant cavity 1406 may be pumped electrically, by applying a voltage across the resonant cavity 1406 (e.g., to electrodes formed on each mirror, outside the resonant cavity 1406), or optically, by receiving electromagnetic radiation into the resonant cavity 1406. The second mirror 1404 may have a reflectivity of less than 100% (e.g., 99%), such that a portion of the electromagnetic radiation amplified by the optical gain material 1408 may escape the resonant cavity 1406 through the second mirror 1404 (e.g., into free space). The escaping electromagnetic radiation has an emission power (i.e., an optical power) of $P_0$.

Figure 15:
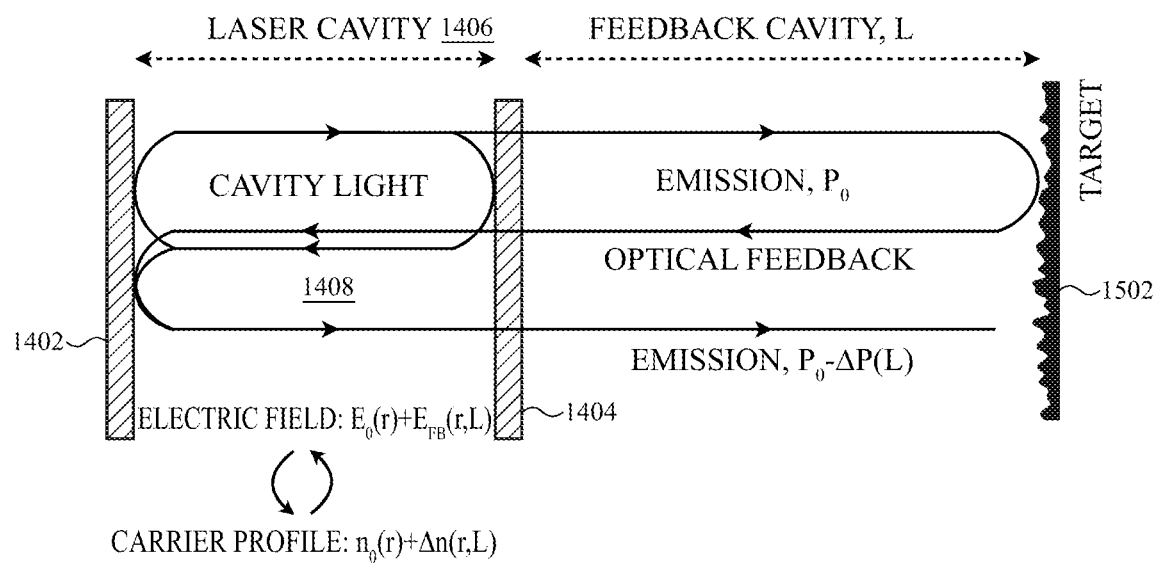

As shown in FIG. 15, the electromagnetic radiation emitted by the electromagnetic radiation source 1400 may reflect from a target 1502 (e.g., a watch crown surface) positioned at a nominal distance, L, from the second mirror 1404. Some of the reflected electromagnetic radiation may re-enter the resonant cavity 1406 as feedback. The feedback carries information about the target 1502. The electromagnetic radiation that re-enters the resonant cavity 1406 mixes with the electromagnetic radiation generated by the electromagnetic radiation source 1400 coherently, to modify both the electromagnetic radiation within the resonant cavity 1406 and the electromagnetic radiation emitted by the electromagnetic radiation source 1400. The modified electromagnetic radiation within the resonant cavity 1406 has an electric field, $E_0(r)+E_{f_B}(r, L)$, and a carrier profile, $n_0(r)+\Delta n(r,L)$. A portion of the electromagnetic radiation that mixes within the resonant cavity 1406 may escape the resonant cavity 1406 through the second mirror 1404, into free space, and has an emission power of $P_0-\Delta P(L)$. The nominal distance to the target, L, can be considered a length of a feedback cavity, such that the resonant cavity 1406 and the feedback cavity represent arms (or branches) of an interferometer, and the power of the beam of electromagnetic radiation emitted by the electromagnetic radiation source 1400 is an interference signal.

Electromagnetic radiation feedback also changes the emission frequency (or wavelength) of the electromagnetic radiation source 1400, due to a modification of the resonant cavity resonance condition in the presence of the feedback cavity. In some embodiments, this wavelength change can be used to detect the interference signal.

Figure 16:
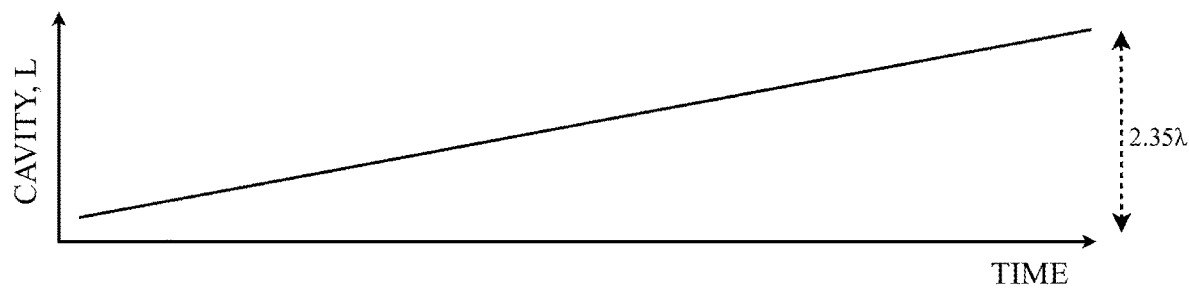
Figure 17:
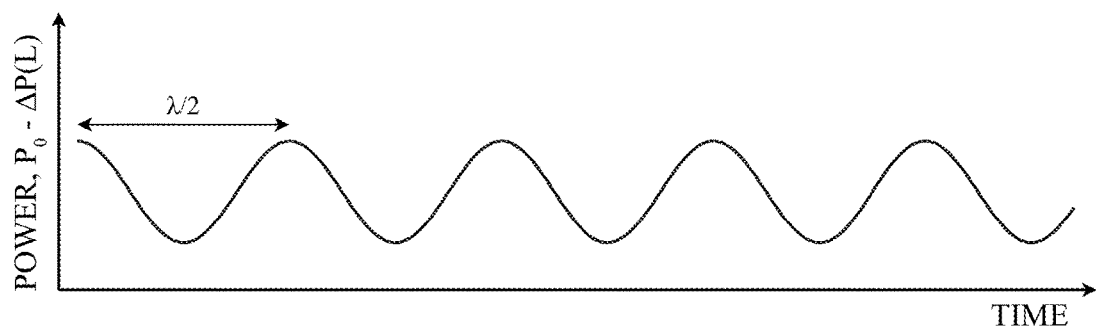

FIG. 16 is a plot showing the distance traveled by a beam of electromagnetic radiation (e.g., a beam of electromagnetic radiation (e.g., light) emitted by an electromagnetic radiation source), in free space (e.g., in the scenario illustrated in FIG. 14), over time. FIG. 16 characterizes the distance traveled by the electromagnetic radiation in terms of a potential feedback cavity length, L, and a number of wavelengths of coherent electromagnetic radiation, k, that define the length of the feedback cavity. Assuming that a feedback cavity has a fixed length, L, FIG. 17 shows a plot of $P_0-\Delta P(L)$ over time. The target always reflects or scatters the same power, but the phase of the reflected or scattered electromagnetic radiation varies. Depending on this phase, $\Delta P(L)$ takes a cosine form with $\Delta P(L) \propto \cos(4\pi L/\lambda)$. In the presence of a strongly varying target movement, this cosine signal can become distorted in a way that indicates the direction of movement of the target. The target may be configured to always redirect the same power of electromagnetic radiation, such that the phase of the redirected electromagnetic radiation that couples into the resonant cavity of the electromagnetic radiation source depends on (or varies with) the feedback cavity length, L.

Figure 18:
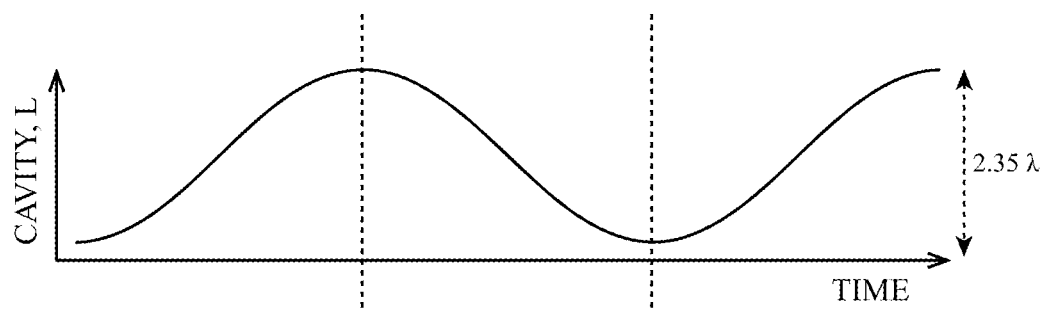
Figure 19:
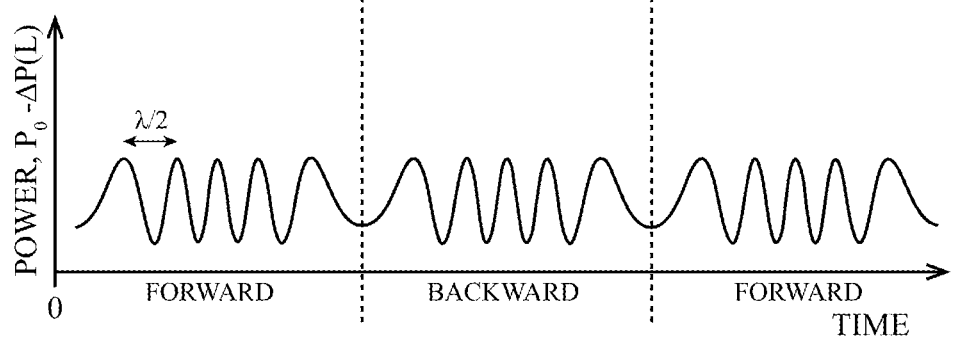

FIG. 18 shows a plot indicating effective changes in feedback cavity length, L, over time, as might occur when a user rotates a crown such that a surface of the crown effectively moves toward (forward, or in one direction) or away (backward, or in an opposite direction) with respect to a laser. By way of example, the feedback cavity length, L, is shown to have a nominal length equal to 2.35λ. FIG. 19 shows the power associated with a beam of electromagnetic radiation reflected by a rotating crown as the crown is rotated in one direction (e.g., forward, or clockwise) then another direction (e.g., backward, or counter-clockwise). When the crown is rotating in the forward direction (e.g., away from the beam of electromagnetic radiation), the power of the reflected beam of electromagnetic radiation has a cosine profile with fringes (peaks) leaning to the left. When the crown is rotating in the backward direction (e.g., toward the beam of electromagnetic radiation), the power of the reflected beam of electromagnetic radiation has a cosine profile with fringes leaning to the right. How pronounced the leaning is depends on the crown surface roughness, the reflectivity of the crown surface, and the distance between the electromagnetic radiation source and the crown surface.

Figure 20:
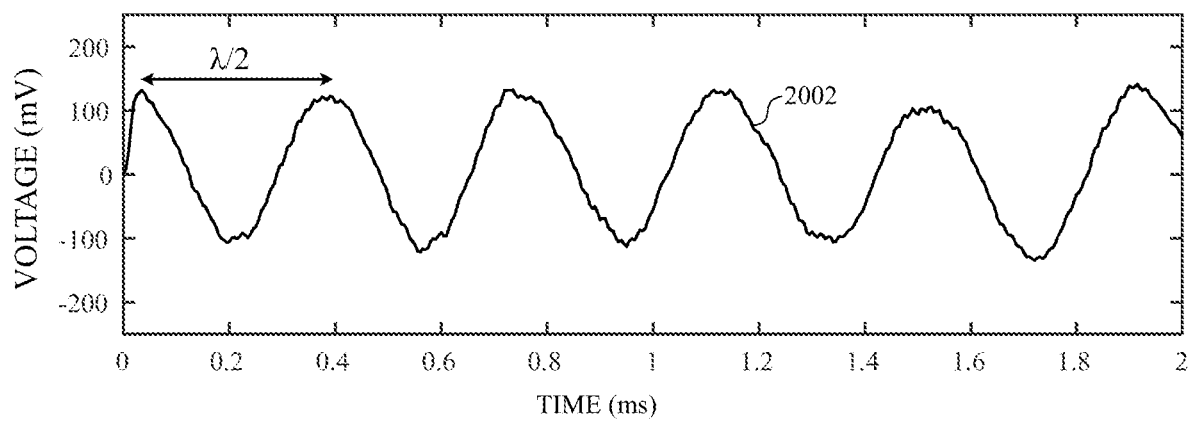
FIG. 20 shows an example of how a beam of electromagnetic radiation dependent on a coherent mixing of electromagnetic radiation within a resonant cavity of an electromagnetic radiation source may affect an amplified output current of a photodetector using a transimpedance amplifier, over time, to produce an interference signal.
Figure 21:
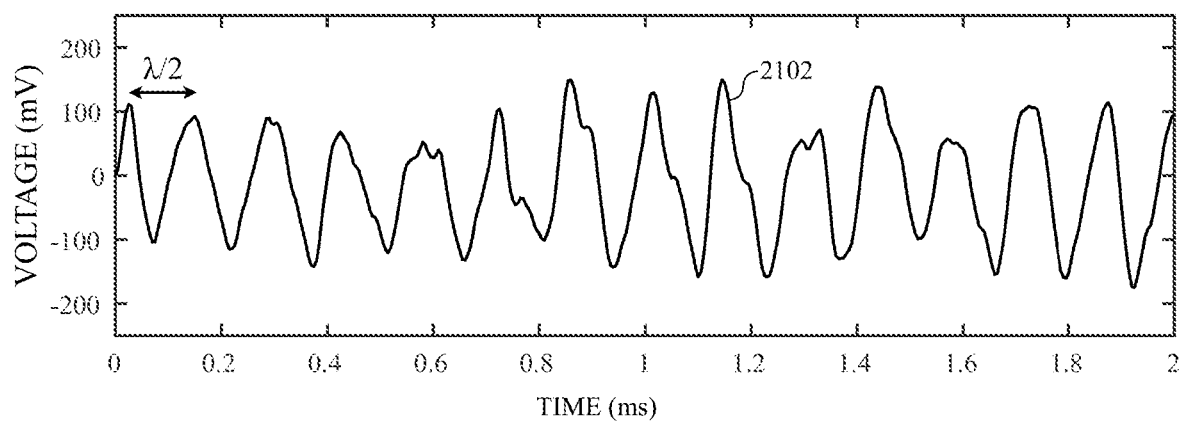
FIG. 21 shows an example of how a beam of electromagnetic radiation dependent on a coherent mixing of electromagnetic radiation within a resonant cavity of an electromagnetic radiation source may affect a junction voltage of a laser, over time, to produce an interference signal.

FIG. 20 shows an example of how a beam of electromagnetic radiation dependent on a coherent mixing of electromagnetic radiation within a resonant cavity of an electromagnetic radiation source may affect an amplified output current of a photodetector using a TIA (e.g., the photodetector described with reference to FIG. 6 or 8), over time, to produce an interference signal 2002. FIG. 21 shows an example of how the same beam of electromagnetic radiation may affect a junction voltage of an electromagnetic radiation source (e.g., the junction voltage of the electromagnetic radiation source described with reference to FIG. 4), over time, to produce an interference signal 2102. In each of FIGS. 20 and 21, the time lapse between two fringes in the illustrated waveform is associated with a length (or distance) of λ/2, and thus, a distance to a target or a speed of movement of a target may be determined from the interference signal shown in FIG. 20 or 21 in the time domain.

Figure 22:
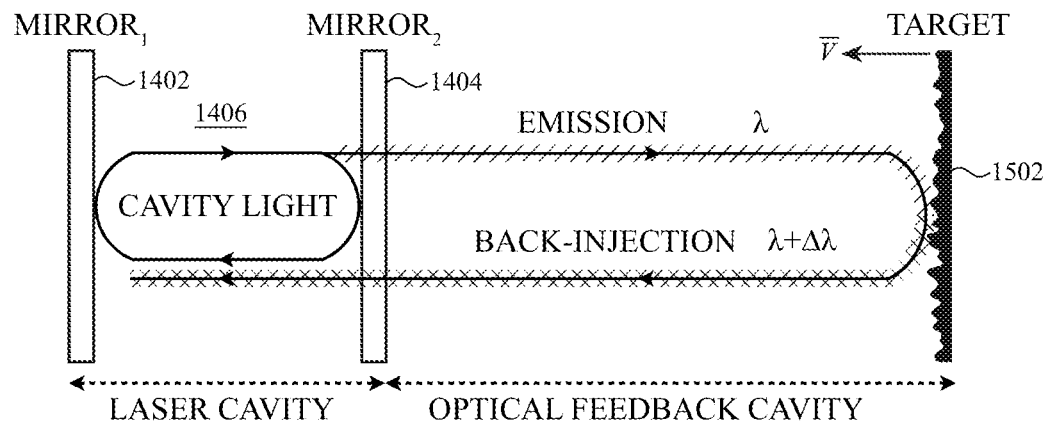
FIGS. 22-25 show how a speed of rotation of a crown may be determined from an interference signal generated as the crown is rotated.

FIGS. 22-25 show how a speed of rotation of a crown may be determined from an interference signal generated as the crown is rotated. FIG. 22 shows the resonant cavity 1406 and feedback cavity described with reference to FIG. 15, but shows the target 1502 moving at a speed, $\bar{v}$, along the axis of the beam of electromagnetic radiation emitted/received by the resonant cavity. In the case of a crown, the crown may be rotating at a speed of rotation having a component parallel to the propagation direction of the electromagnetic radiation.

A beam of electromagnetic radiation emitted by the electromagnetic radiation source 1400 may be emitted at a wavelength, λ, but reflected at a wavelength of λ+Δλ due to movement of the target 1502. A Doppler shift between the electromagnetic radiation generated by the electromagnetic radiation source 1400 and the electromagnetic radiation redirected by the target 1502 therefore exists within the resonant cavity 1406 and affects the beam of electromagnetic radiation emitted by the electromagnetic radiation source 1400. This Doppler shift is also present in the junction voltage of the electromagnetic radiation source 1400, and in a current or voltage generated by a photodetector that detects the beam of coherent light. In addition, the Doppler shift is also present in the bias current of the electromagnetic radiation source 1400 when the electromagnetic radiation source 1400 is driven at a constant voltage. The Doppler shift includes information about the velocity of the target 1502 (e.g., the velocity of a crown), whereas the phase of the second harmonic of the beam of electromagnetic radiation indicates a direction of rotation of the crown.

Figure 23:
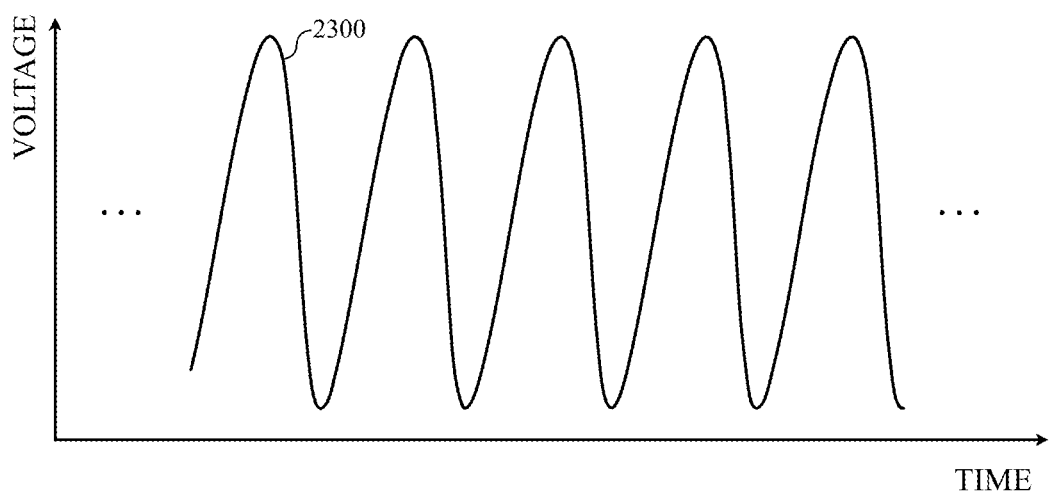
Figures 24, 25:
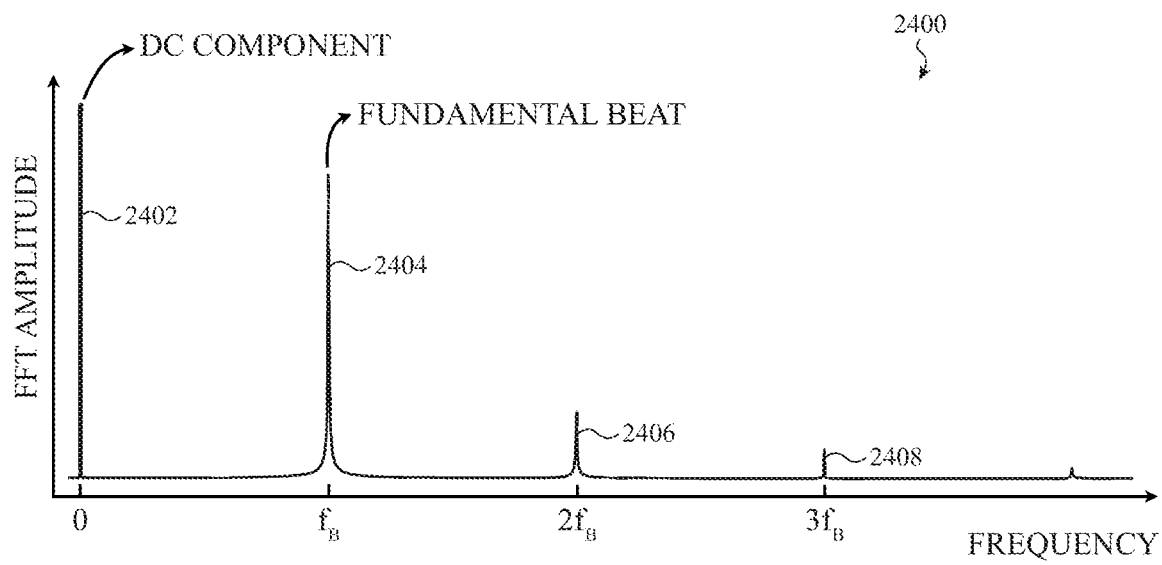

The junction voltage of the electromagnetic radiation source 1400 (e.g., an interference signal) may be monitored as a crown is rotated, and amplified by a voltage sensor. The amplified junction voltage may have a waveform 2300 as shown in FIG. 23. Upon visual inspection, the interference signal appears to have a distorted cosine function with a slight lean to the right (implying movement of the crown in a first direction). An FFT 2400 of the interference signal may appear as shown in FIG. 24, and may include a number of frequency components, including a DC component 2402 at frequency 0, a fundamental beat 2404 at frequency $f_B$, a second harmonic 2406 at frequency $2f_B$, and a third harmonic 2408 at frequency $3f_B$. The following equations may be used, for example, to determine the speed of movement (e.g., speed of rotation) of the target 1502 shown in FIG. 15 or 22, or the speed of a watch crown:

$$f_B = c \times \frac{\Delta\lambda}{\lambda^2}$$

$$\Delta\lambda = \frac{2\lambda}{c} v$$

In the above equations, c is the speed of light. The table 2500 shown in FIG. 25 shows an example set of relationships between the speed $(\bar{v})$, $\Delta\lambda$, and the fundamental beat $(f_B)$.

Figure 26:
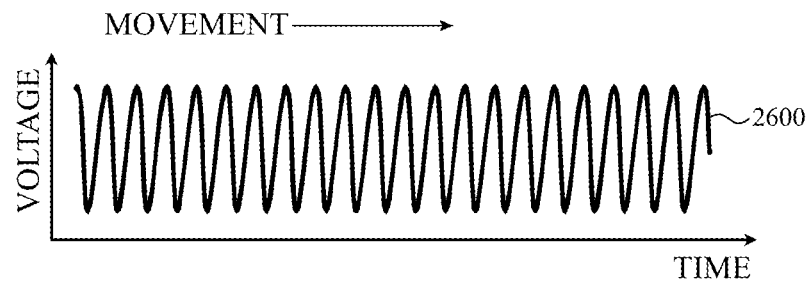
FIGS. 26-29 show how a direction of rotation of a crown may be determined from an interference signal generated as the crown is rotated.
Figure 27:
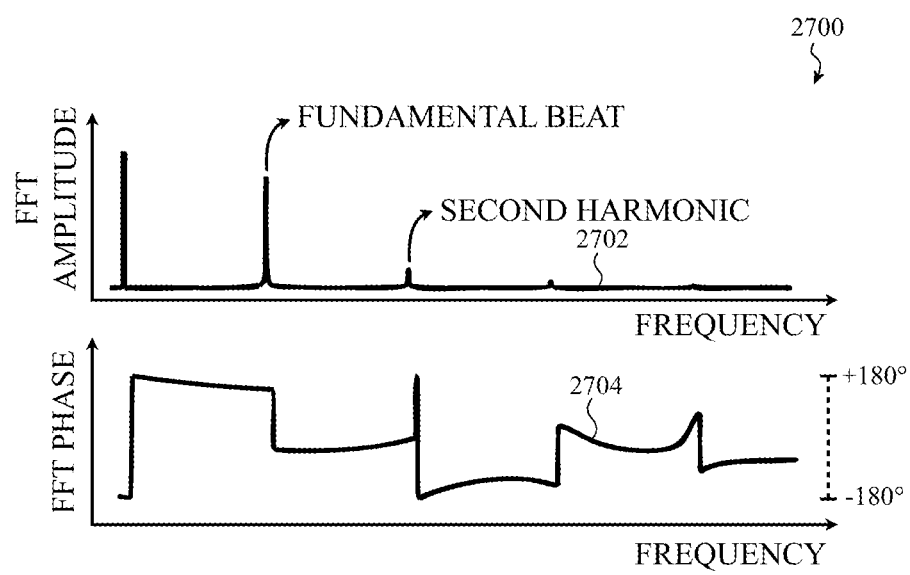

FIGS. 26-29 show how a direction of rotation of a crown may be determined from an interference signal generated as the crown is rotated. FIG. 26 shows an example of an interference signal 2600 (e.g., a voltage signal) that may be generated over time as a crown is rotated. Upon visual inspection, the interference signal appears to be defined by a cosine function, but with a distortion that causes the fringes of the cosine waveform to lean to the right (implying movement of the crown in a first rotational direction). FIG. 27 shows an FFT 2700 of the interference signal 2600 (e.g., an amplitude 2702 of the signal's frequency components, and a phase 2704 of the signal's frequency components). The phases of the first and second harmonics is indicative of the direction of rotation. For example, by solving the equation 2×(phase at $f_B$)−(phase at $2f_B$), rotated value of 103.3° may be obtained, which is greater than zero. Thus the crown has been rotated in the first direction (e.g., clockwise, or away from the sensor system).

Figure 28:
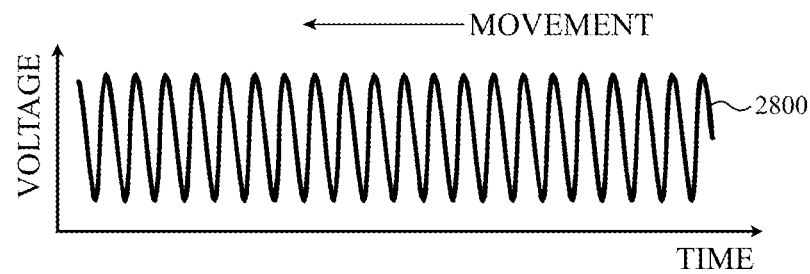
Figure 29:
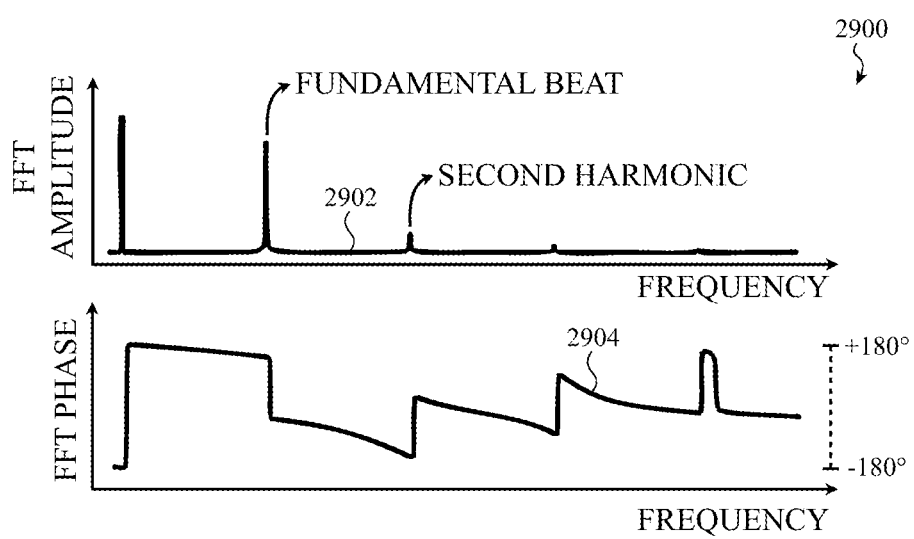

FIG. 28 shows another example of an interference signal 2800 (e.g., a voltage signal) that may be generated over time as the crown is rotated. Upon visual inspection, the interference signal appears to be defined by a cosine function, but with a distortion that causes fringes of the cosine waveform to lean to the left (implying movement of the crown in a second rotational direction). FIG. 29 shows an FFT 2900 of the interference signal 2800 (e.g., an amplitude 2902 of the signal's frequency components, and a phase 2904 of the signal's frequency components). The phases of the first and second harmonics is indicative of the direction of rotation. For example, by solving the equation 2×(phase at $f_B$)−(phase at $2f_B$), a value of −103.3° may be obtained, which is less than zero. Thus, the crown has been rotated in the second direction (e.g., counter-clockwise, or toward the sensor system).

Figure 30:
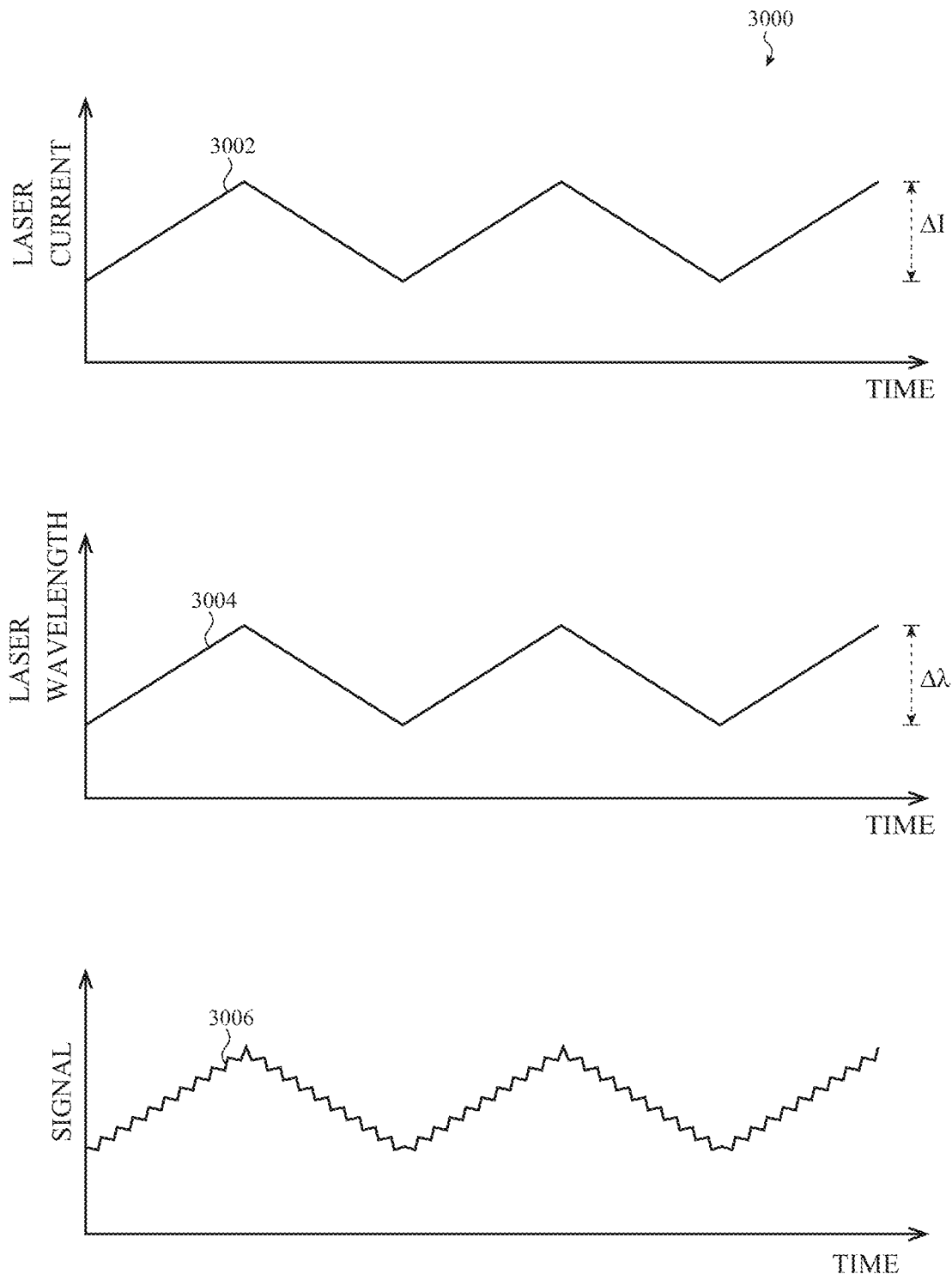
FIG. 30 shows time correlated graphs of an electromagnetic radiation source's current, wavelength, and interference signal indicating movement of a target (e.g., a crown)

FIG. 30 shows time correlated graphs 3000 of an electromagnetic radiation source's current 3002 (also called a modulated current), wavelength 3004, and interference signal 3006 indicating movement of a target (e.g., a crown). The interference signal 3006 is shown superimposed on the current 3002. The interference signal 3006 may be generated in response to a user moving a crown (e.g., in response to user input), and may be detected in by monitoring a current or voltage of an adjacent or integrated photodetector, or by monitoring a junction voltage (when the electromagnetic radiation source is at a constant current) or a bias current (when the electromagnetic radiation source is at a constant voltage). By driving an electromagnetic radiation source with a modulated input, such as the current 3002 having a triangular waveform, the electromagnetic radiation produced by the electromagnetic radiation source may have a wavelength 3004 that modulates similarly. As a result of movement of a crown (or other surface illuminated by a beam of electromagnetic radiation emitted by the electromagnetic radiation source), the coherent mixing of electromagnetic radiation within a resonant cavity of the electromagnetic radiation source causes the interference signal 3006 to appear as a waveform having a distorted cosine function superimposed on the modulated waveform 3002. The triangular-shaped modulated current 3002 can enable spectrum analyses (e.g., FFTs, as explained with respect to FIG. 31) of samples taken during the time intervals corresponding to ascending edges and/or descending edges of the triangular-shaped modulated current 3002. While the graphs 3000 are shown for a triangular-shaped modulated current 3002, the current could alternatively be modulated according to waveforms having other shapes. Also, while the current 3002 is shown to have equal time ascending and descending time intervals, these time intervals may have different durations in some embodiments.

Figure 31:
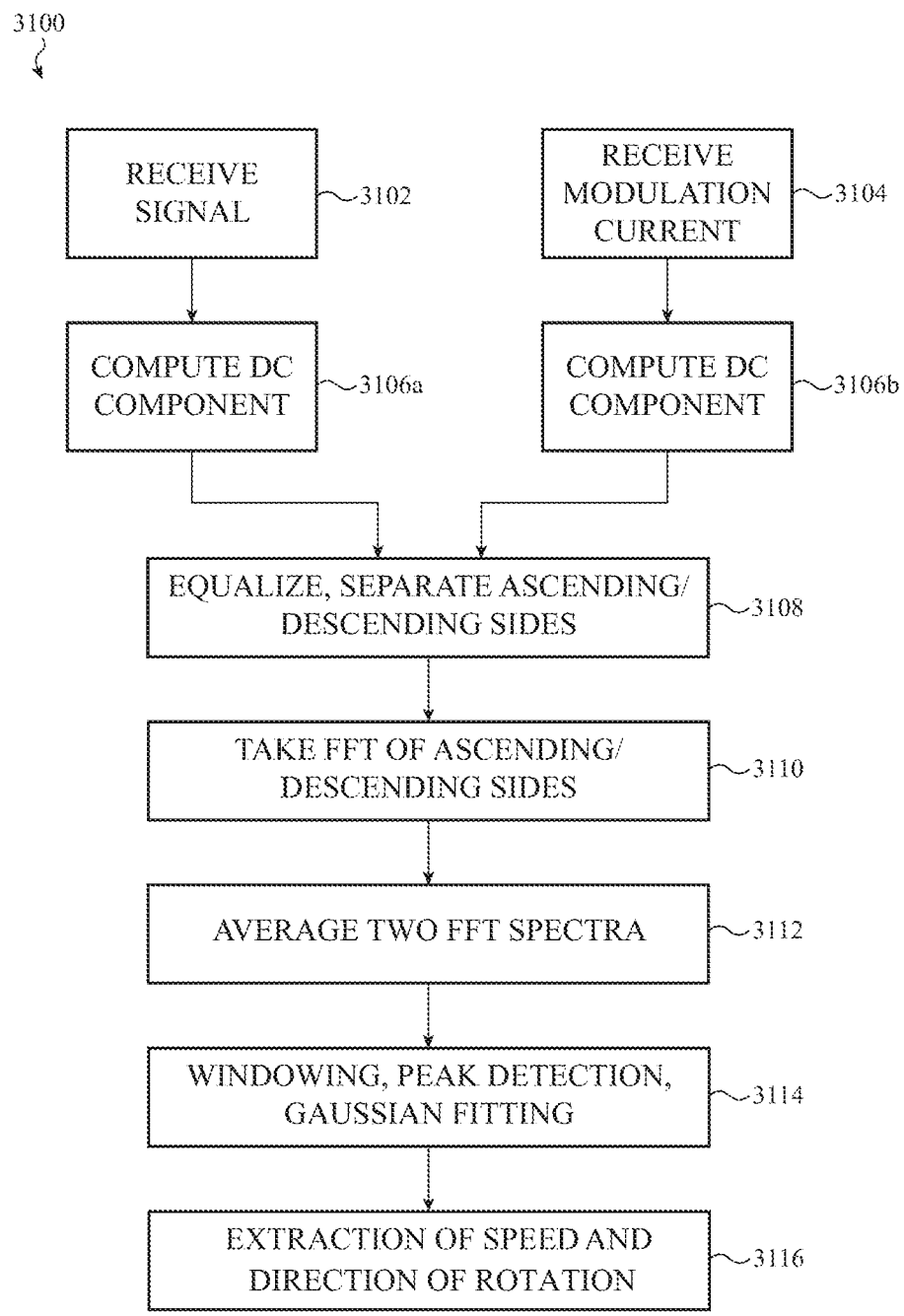
FIG. 31 shows a flowchart of a method for determining speed or direction of rotation of a crown.

FIG. 31 shows a flowchart 3100 of a method for determining speed or direction of rotation of a crown. The flowchart 3100 is predicated on driving an electromagnetic radiation source with a modulated current (e.g., current 3002) or voltage, and obtaining an interference signal (e.g., the signal 3006). At blocks 3102 and 3104, the interference signal 3006 and modulated current 3002 are received at a processor. Various blocks of the method may be performed by the same or different processors.

At blocks 3106a and 3106b, the direct current (DC) component of the two signals may be optionally computed removed from the signals 3002 and 3006. At block 3108, the signals 3002 and 3006 may be equalized, as necessary; the modulated signal 3002 may be subtracted from the signal 3006, and information (e.g., digital samples) associated with the ascending and descending edges (sides) of the interference signal 3006 may be separated.

At block 3110, a separate FFT may be performed for the information associated with the ascending edges and the information associated with the descending edges, and at block 3112, the separate FFT spectra may be averaged.

At block 3114, further processing of the averaged FFT spectra may be undertaken (e.g., to remove artifacts and reduce noise). Such further processing may include windowing, peak detection, and Gaussian fitting.

From the processed FFT spectra, information regarding user input to a crown, such as a speed or direction of rotation, can be obtained.

The method just described, and variations thereof, involve applying a spectrum analysis to an interference signal (e.g., a waveform having a distorted cosine function). Alternative methods for characterizing movement of a watch crown may be performed in the time domain, and may not require performing a spectrum analysis.

Figure 32:
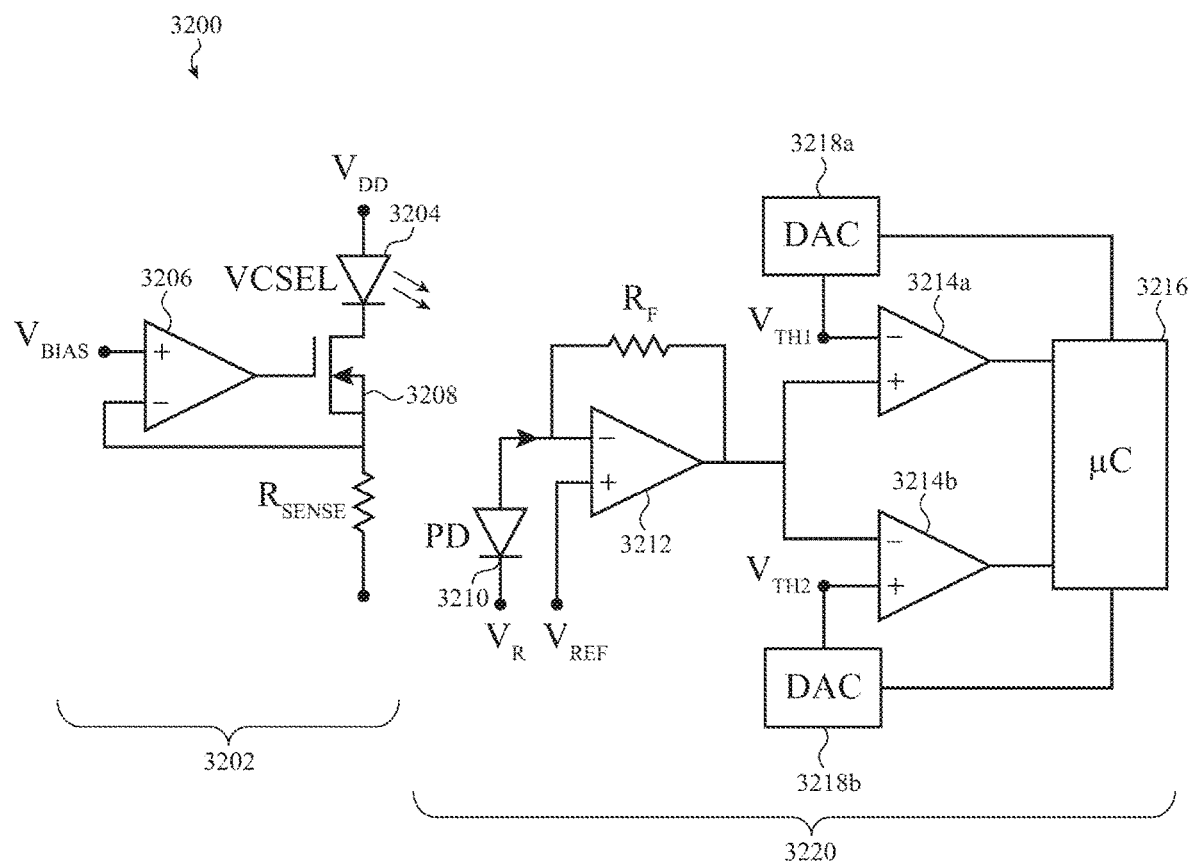
FIG. 32 shows an example of a circuit that can be used when determining a speed or direction of rotation of a crown in the time domain.

FIG. 32 shows an example of a circuit 3200 that can be used when determining a speed or direction of rotation of a crown in the time domain. A time domain analysis can be used to obtain properties of a user input directly from an interference signal, without the need to perform a spectrum analysis. The configuration of the circuit 3200 is one example of an embodiment, and in some cases the circuit may be otherwise embodied.

The circuit 3200 includes two sections. The first section 3202 includes an electromagnetic radiation source, such as a VCSEL 3204, and other biasing circuitry. The circuitry includes an amplifier 3206 that accepts a bias voltage input and produces an output that drives a gate of transistor 3208 positioned at the cathode of the VCSEL 3204. This input circuitry can be used to apply the modulated current 3002 to the VCSEL 3204. Included in section 3202 is a sensing resistor ($R_{SENSE}$).

The second section 3220 of the circuit 3200 may receive and analyze an interference signal included a beam of electromagnetic radiation emitted by the VCSEL 3204. In the particular embodiment shown, coherent light is received from the VCSEL 3204 at a photodiode 3210. In other embodiments, such as those that do not use a photodiode, the interference signal may be obtained as a junction voltage, bias current, power, or other electrical property measured in section 3202. For example, the current across the sensing resistor in section 3202, rather than the photodiode current or voltage shown, may be the input to the amplifier 3212. The amplifier 3212 can be used to buffer and/or amplify the interference signal.

The output of amplifier 3212 may be input to a pair of comparators 3214a and 3214b. The comparators 3214a and 3214b may be configured to trigger at different threshold voltages, VTH1 and VTH2, and may respectively detect rising and falling edges of the interference signal. The threshold voltages of the comparators 3214a and 3214b can be controlled by a microcontroller 3216 or other processor. In embodiments in which the microcontroller 3216 has digital outputs, the digital outputs thereof can adjust the trigger threshold voltages of the comparators 3214a and 3214b by first being converted to analog threshold voltages by the digital-to-analog (DAC) converters 3218a and 3218b.

Figure 33:
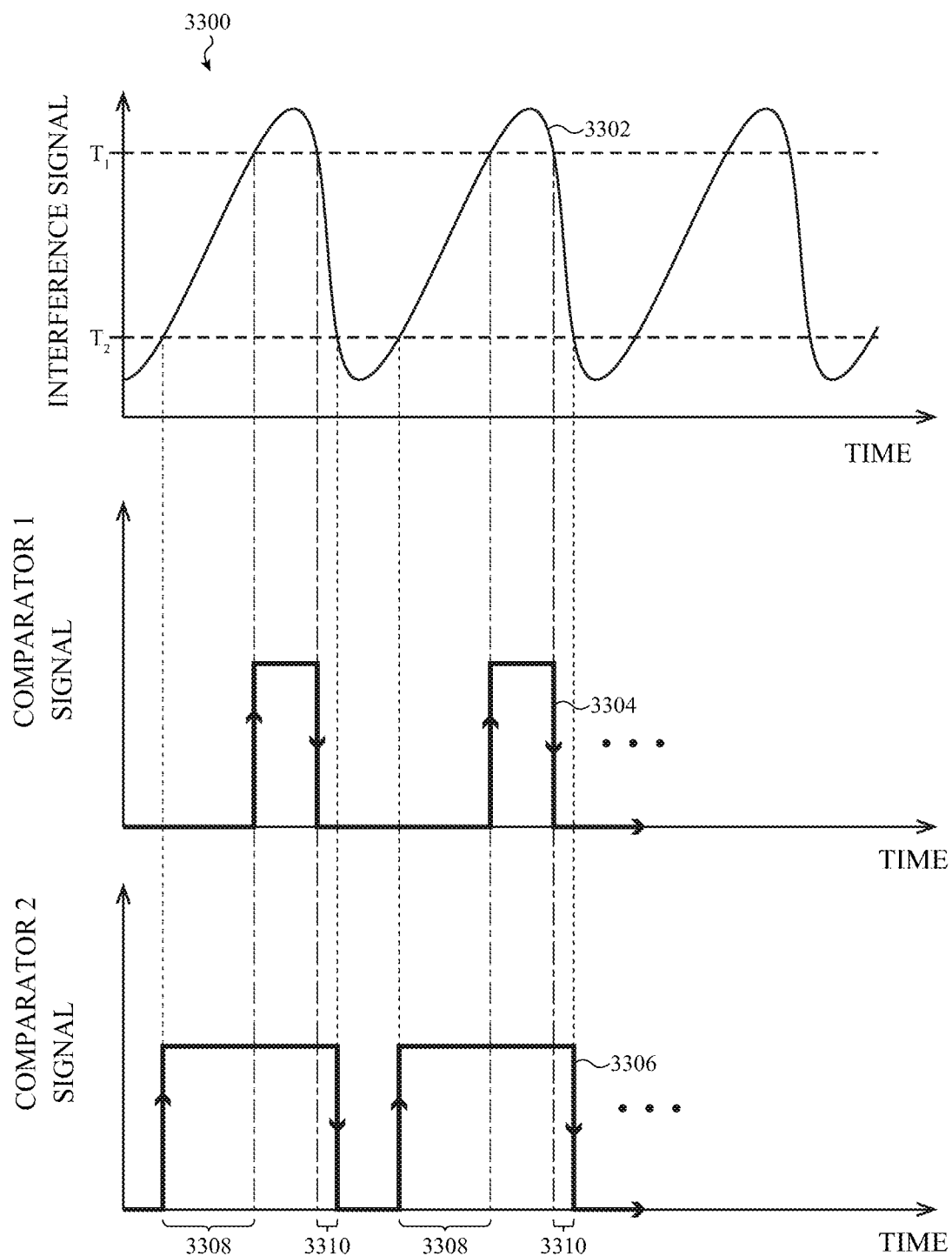
FIG. 33 shows time correlated graphs for determining a speed or direction of rotation of a crown in the time domain.

FIG. 33 shows time correlated graphs 3300 for determining a speed or direction of rotation of a crown in the time domain. The graphs 3300 show an interference signal 3302, together with the outputs 3304 and 3306 of the comparators 3214a and 3214b described with reference to FIG. 32. The interference signal 3302, in the example shown, traces a distorted cosine function. The comparator 3214a is configured (by the trigger threshold voltage, VTH1) to detect when the signal 3302 crosses a high threshold, T1, and the comparator 3214b is configured (by the trigger threshold voltage, VTH2) to detect when the signal 3302 crosses a lower threshold, T2.

Because the lower threshold T2 is set lower than the upper threshold T1, the interference signal 3302 exceeds the lower threshold T2 during a longer time period than it exceeds the upper threshold T1. The time period during which the signal 3302 exceeds the upper threshold T1 is a sub-period of the time period during which the signal 3302 exceeds the lower threshold T2. As a consequence, there is a first time interval 3308 between when the comparator 3214b triggers 'on' until when the comparator 3214a triggers 'on.' This is the time difference between rising edges. Similarly, there is a second time interval 3310 between when the comparator 3214a triggers 'off' until when the comparator 3214b triggers 'off.' This is the time difference between falling edges.

The difference in lengths of time of the first time interval 3308 and the second time interval 3310 can be used to characterize watch crown movement. In the example shown, a watch crown is moving in a first direction (e.g., clockwise, or toward an electromagnetic radiation source), such that the signal 3302 has a distorted cosine shape with fringes leaning to the right. As result, the first time interval 3308 exceeds the second time interval 3310. This excess implies the first direction of crown rotation. An opposite direction of movement would be implied by the opposite condition. The durations of the time periods during which the signal 3302 exceeds the lower threshold T1 and the upper threshold T2 may also be used to determine the speed of rotation of a crown.

Figure 34:
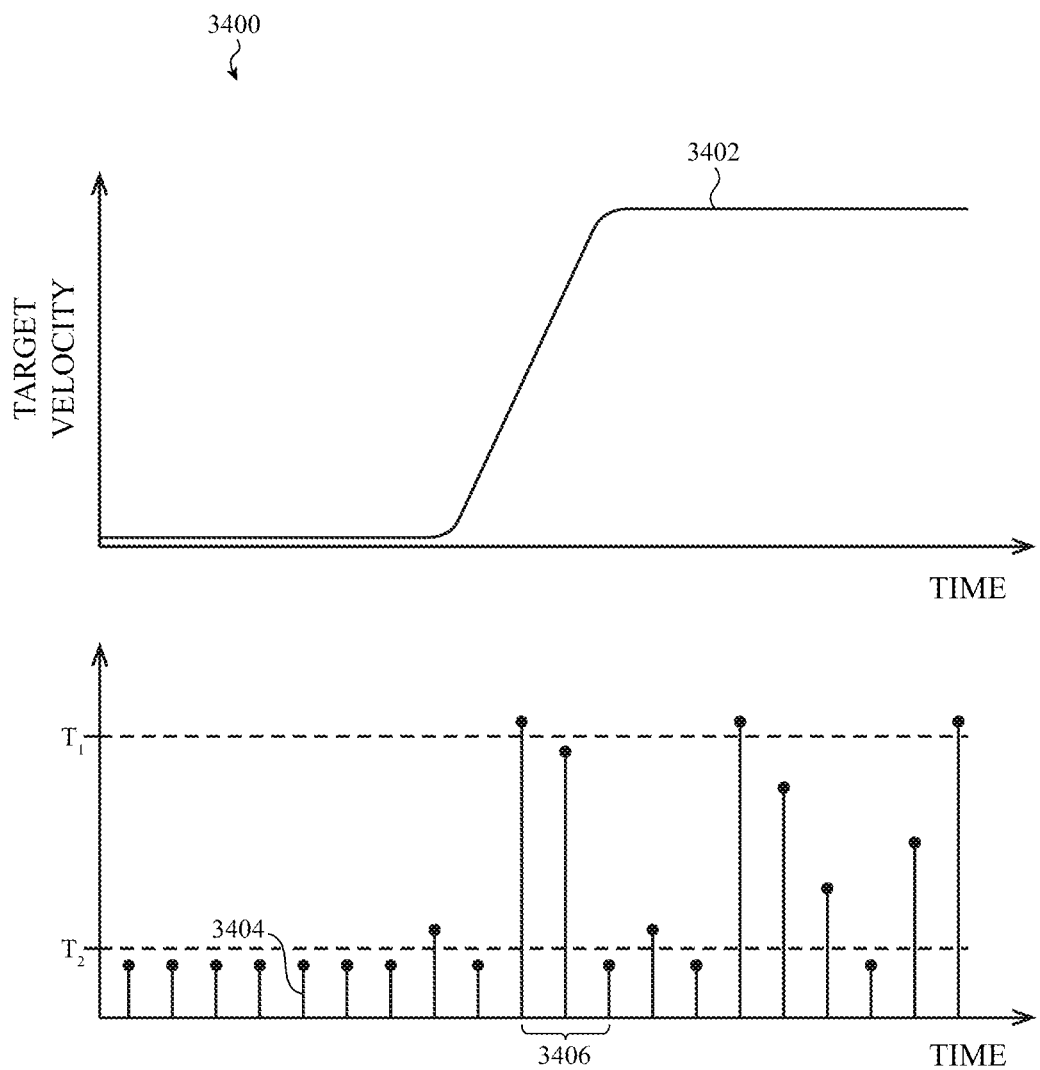
FIG. 34 shows time correlated graphs of a target's speed of rotation (or speed of movement) and a sampled output of the circuit shown in FIG. 32.

FIG. 34 shows time correlated graphs 3400 of a target's speed of rotation (or speed of movement) and a sampled output of the circuit shown in FIG. 32. In this embodiment, the interference signal 3404 may in some cases be a sampling of the output of the amplifier 3212 shown in FIG. 32. The sampling period can be chosen to detect rapid changes in the target velocity due to user input. The interference signal 3404 shown may, for example, represent samples of the continuous time signal 3402.

In the correlated graphs 3400, the velocity 3402 is initially zero (or approximately so), such as may occur when a crown is not moved. When a user begins moving the crown, the velocity 3402 shows an initial increase before stabilizing at the user's desired scroll speed. As a result, the sampled interference signal 3404 may alternately exceed the upper threshold T1 and then fall back below the lower threshold T2. The time interval 3406 from exceeding the upper threshold T1 till falling below the lower threshold T2 can be related to the target velocity. Similarly, the time interval between a sample being below the lower threshold T2 until a sample exceeds the upper threshold T1 may be used to determine the speed of rotation or other characteristics of watch crown movement.

Figure 35:
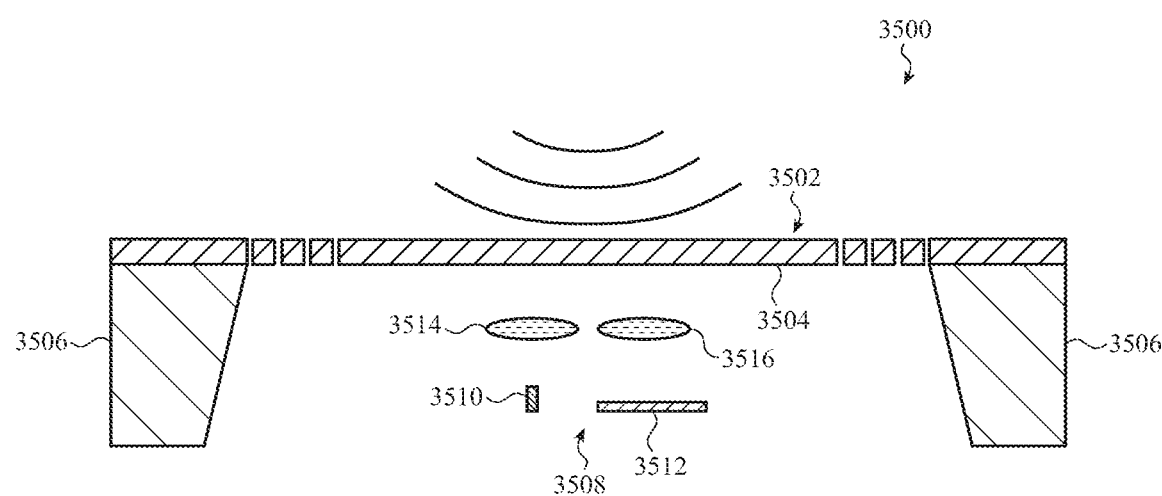
FIG. 35 shows an example of a microphone having a diaphragm.

To detect translation of a crown, a sensor system including an electromagnetic radiation source (as described herein) may be positioned at 204a or 204b in FIG. 3, for example, and may emit a beam of electromagnetic radiation having an axis that has a vectorial component parallel to the longitudinal axis of the shaft 206 shown in FIG. 3. FIG. 35 shows another application in which a sensor system including an electromagnetic radiation source may be positioned to detect movement of a surface (or target) toward or away from the sensor system. In particular, FIG. 35 shows an example of a microphone 3500 having a diaphragm 3502. The diaphragm 3502 may be generally planar and have a circular circumference. In other embodiments, the diaphragm 3502 may be cupped, or have an oval or square perimeter, or have other shapes or forms. In some embodiments, the bottom (or inner) surface 3504 of the diaphragm 3502 may be optically flat (e.g., providing specular reflections) or rough (e.g., providing scattering/diffusive reflections). In some embodiments, the surface 3504 may be defined by a BRDF.

The diaphragm 3502 may be supported at its perimeter by a housing or mechanical support member 3506 having an opening therein. The microphone 3500 need not have a backplate forming a cavity under the diaphragm 3502. Elimination of any cavity or backplate under the diaphragm 3502 tends to reduce thermal noise and increase the SNR of the microphone 3500.

A sensor system 3508 may be positioned under the diaphragm 3502. The sensor system 3508 may include an electromagnetic radiation source 3510 (e.g., a VCSEL or other source) and a sensor 3512. The sensor 3512 may include an electrical sensor (e.g., a voltage or current detector) or optoelectronic sensor (e.g., a photodetector), and may be configured similarly to one or more of the sensors described with reference to FIG. 4, 6, or 8. By way of example, FIG. 35 shows the sensor 3512 to be a photodetector positioned adjacent the electromagnetic radiation source 3510.

In some embodiments of the microphone 3500, one or more optical components (e.g., a lens 3514) may be positioned between the electromagnetic radiation source 3510 and the diaphragm 3502. Alternatively or additionally, in embodiments in which the sensor 3512 includes a photodetector positioned adjacent the electromagnetic radiation source 3510, one or more optical components (e.g., a lens 3516) may be positioned between the diaphragm and the photodetector. A lens and/or other optical components positioned between the laser and the diaphragm may, for example, collimate or focus electromagnetic radiation (e.g., light), or filter out wavelengths of electromagnetic radiation other than a particular wavelength or wavelengths of electromagnetic radiation emitted by the electromagnetic radiation source. In some cases, a lens or other optical component may be formed directly on the electromagnetic radiation source 3510 using semiconductor processing or die encapsulation techniques.

A lens 3516 and/or other optical components positioned between the diaphragm 3502 and a photodetector may focus electromagnetic radiation redirected (e.g., reflected or scattered) by the diaphragm 3502 to increase the amount of electromagnetic radiation received by the photodetector (e.g., to improve electromagnetic radiation collection efficiency). The lens 3516 and/or other optical components may also filter out wavelengths of electromagnetic radiation other than a particular wavelength of electromagnetic radiation emitted by the electromagnetic radiation source 3510. In some cases, a lens 3516 or other optical component may be formed directly on a photodetector using semiconductor processing or die encapsulation techniques.

The lens 3514 or 3516 may be positioned on-axis or off-axis with respect to the electromagnetic radiation source 3510 or sensor 3512. In some embodiments, reflective or diffractive optical elements can be used instead of or in addition to the lens 3514 or 3516.

In operation, the electromagnetic radiation source 3510 may emit a beam of electromagnetic radiation toward the bottom or inner surface 3504 of the diaphragm 3502. The beam of electromagnetic radiation may be redirected (e.g., reflected or scattered) by the diaphragm 3502 at an approximate right angle (e.g., perpendicular or substantially perpendicular to the diaphragm), and a portion of the redirected electromagnetic radiation may re-enter the electromagnetic radiation source 3510. Electromagnetic radiation generated by the electromagnetic radiation source 3510 may coherently mix with the redirected electromagnetic radiation that re-enters the electromagnetic radiation source 3510. The redirected electromagnetic radiation may have a phase difference compared to the generated electromagnetic radiation, resulting in an interference signal being produced when the generated and redirected electromagnetic radiation are coherently mixed. The phase difference may modulate (e.g., as sound or pressure waves cause the diaphragm to move).

Similarly to the detection of crown parameters, a sensor 3512 may be used to determine diaphragm parameters, such as a displacement of the diaphragm 3502, a speed at which the diaphragm is moving toward or away from the sensor 3512, or an acceleration of the diaphragm 3502. From these parameters, a processor may reconstruct a stimulus (e.g., sound wave) received by the diaphragm 3502.

In some embodiments, the bias current of the electromagnetic radiation source 3510 may be dynamically changed (e.g., in real-time) using a feedback circuit. In this manner, active phase nulling may be performed, owing to a change of an electromagnetic radiation wavelength with respect to the bias current. When using active phase nulling, diaphragm displacements much larger than the wavelength of the beam of electromagnetic radiation emitted by the electromagnetic radiation source 3510 may be unambiguously detected.

The structures and principles employed in the microphone 3500 may alternatively be used to detect movement characteristics of a squeezable exterior of an electronic device, or to detect movement of a physical or virtual button.

Figure 36:
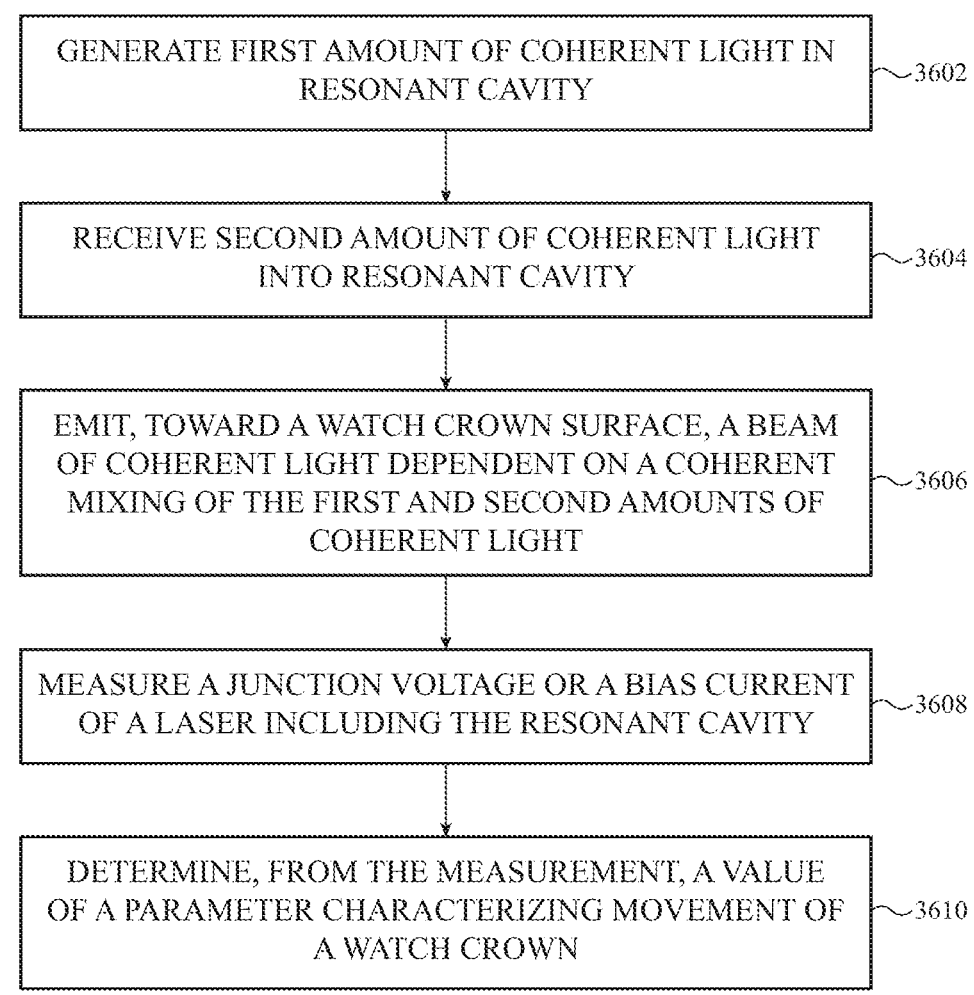
FIG. 36 shows an example method of determining a value of a parameter characterizing movement of a watch crown.

FIG. 36 shows an example method 3600 of determining a value of a parameter characterizing movement of a watch crown.

At block 3602, a first amount of coherent light (or at least partially coherent electromagnetic radiation) may be generated in a resonant cavity of a laser (or other electromagnetic radiation source). The coherent light generated by the laser may be emitted from the resonant cavity toward a watch crown surface, and may be redirected (e.g., reflected or scattered) by the watch crown surface. The operation(s) at 3602 may be performed, for example, by the sensor system, electromagnetic radiation source, or laser described with reference to any of FIG. 2-15, 22, or 35.

At block 3604, a second amount of coherent light, redirected from the watch crown surface, may be received into (or re-enter) the resonant cavity. The operation(s) at 3604 may be performed, for example, by the sensor system, electromagnetic radiation source, or laser described with reference to any of FIG. 2-15, 22, or 35.

At block 3606, the resonant cavity may emit a beam of coherent light dependent on a coherent mixing of the first amount of coherent light and the second amount of coherent. The beam of coherent light may be emitted toward the watch crown surface, and may be redirected by the watch crown surface. The operations in blocks 3602, 3604, and 3606 may be repeated. The operation(s) at 3606 may be performed, for example, by the sensor system, electromagnetic radiation source, or laser described with reference to any of FIG. 2-15, 22, or 35.

At block 3608, a junction voltage or a bias current of the laser may be measured. The junction voltage or the bias current may depend on the coherent mixing of the first amount of coherent light and the second amount of coherent light within the resonant cavity. Alternatively or additionally, the operation(s) at block 3608 may include measuring an optical power of the beam of coherent light. The operation(s) at 3608 may be performed, for example, by the sensor system or sensor described with reference to any of FIG. 2-13 or 35.

At block 3610, a value of a parameter characterizing movement of the watch crown may be determined from at least the measurement of the junction voltage or the bias current. The operation(s) at 3610 may be performed, for example, by the sensor system or sensor described with reference to any of FIG. 2-13 or 35, or by the processor described with reference to FIG. 37.

Figure 37:
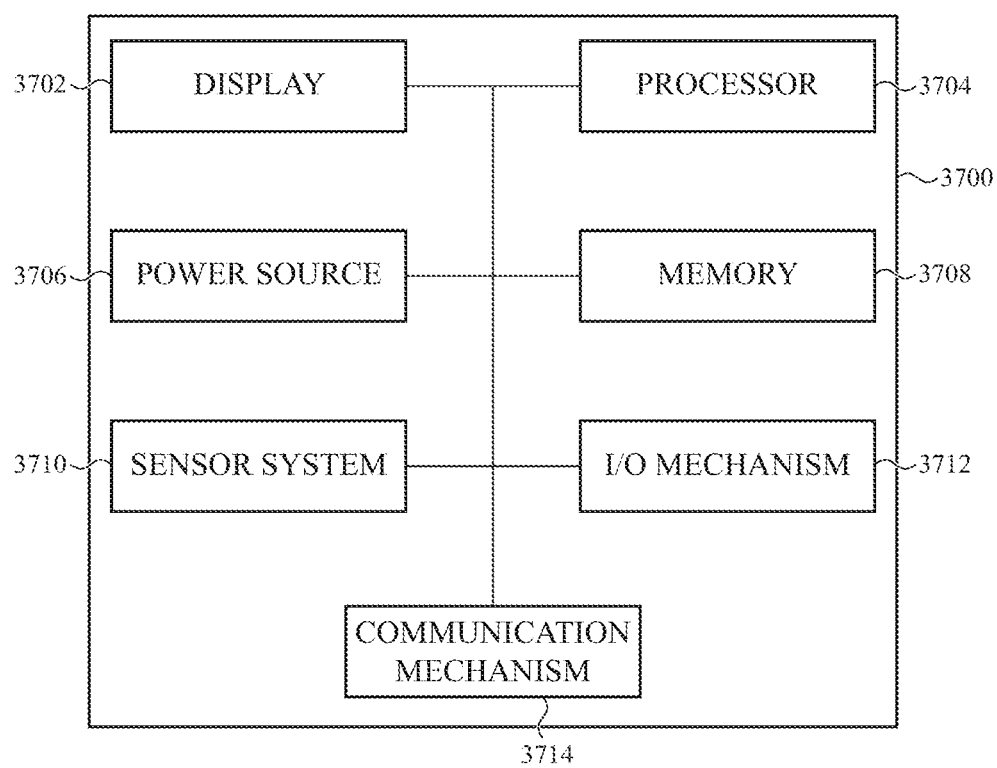
FIG. 37 shows a sample electrical block diagram of an electronic device.

FIG. 37 shows a sample electrical block diagram of an electronic device 3700, which electronic device may in some cases take the form of an electronic watch or other wearable electronic devices described herein. The electronic device 3700 can include a display 3702 (e.g., a light-emitting display), a processor 3704, a power source 3706, a memory 3708 or storage device, a sensor system 3710, and an input/output (I/O) mechanism 3712 (e.g., an input/output device, input/output port, or haptic input/output interface). The processor 3704 can control some or all of the operations of the electronic device 3700. The processor 3704 can communicate, either directly or indirectly, with some or all of the components of the electronic device 3700. For example, a system bus or other communication mechanism 3714 can provide communication between the processor 3704, the power source 3706, the memory 3708, the sensor system 3710, and the I/O mechanism 3712.

The processor 3704 can be implemented as any electronic device capable of processing, receiving, or transmitting data or instructions. For example, the processor 3704 can be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

It should be noted that the components of the electronic device 3700 can be controlled by multiple processors. For example, select components of the electronic device 3700 (e.g., a sensor system 3710) may be controlled by a first processor and other components of the electronic device 3700 (e.g., the display 3702) may be controlled by a second processor, where the first and second processors may or may not be in communication with each other. In some cases, the processor 3704 may determine a biological parameter of a user of the electronic device, such as an ECG for the user.

The power source 3706 can be implemented with any device capable of providing energy to the electronic device 3700. For example, the power source 3706 may be one or more batteries or rechargeable batteries. Additionally or alternatively, the power source 3706 can be a power connector or power cord that connects the electronic device 3700 to another power source, such as a wall outlet.

The memory 3708 can store electronic data that can be used by the electronic device 3700. For example, the memory 3708 can store electrical data or content such as, for example, audio and video files, documents and applications, device settings and user preferences, timing signals, control signals, and data structures or databases. The memory 3708 can be configured as any type of memory. By way of example only, the memory 3708 can be implemented as random access memory, read-only memory, Flash memory, removable memory, other types of storage elements, or combinations of such devices.

The electronic device 3700 may also include one or more sensor systems 3710 positioned almost anywhere on the electronic device 3700. The sensor system(s) 3710 can be configured to sense one or more type of parameters, such as but not limited to, crown movement (rotation or translation); pressure on the display 3702, a crown, a button, or a housing of the electronic device 3700; light; touch; heat; movement; relative motion; biometric data (e.g., biological parameters) of a user; and so on. For example, the sensor system(s) 3710 may include a watch crown sensor system, a heat sensor, a position sensor, a light or optical sensor, an accelerometer, a pressure transducer, a gyroscope, a magnetometer, a health monitoring sensor, and so on. Additionally, the one or more sensor systems 3710 can utilize any suitable sensing technology, including, but not limited to, capacitive, ultrasonic, resistive, optical, ultrasound, piezoelectric, and thermal sensing technology. In some examples, the sensor system(s) 3710 may include one or more of the watch crown sensor systems described herein (e.g., a sensor system including one or more electromagnetic radiation sources or lasers, voltage detectors or current detectors, photodetectors, and so on).

The I/O mechanism 3712 can transmit and/or receive data from a user or another electronic device. An I/O mechanism can include a display, a touch sensing input surface, a crown, one or more buttons (e.g., a graphical user interface "home" button), one or more cameras, one or more microphones or speakers, one or more ports such as a microphone port, and/or a keyboard. Additionally or alternatively, an I/O mechanism 3712 can transmit electronic signals via a communications network, such as a wireless and/or wired network connection. Examples of wireless and wired network connections include, but are not limited to, cellular, Wi-Fi, Bluetooth, IR, and Ethernet connections.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed.

What is claimed is:

1. A watch body, comprising:
a housing at least partially defining an interior of the watch body;
a retaining feature formed in or extending from the housing;
a watch crown retained by the retaining feature and operable to be rotated by a user, the watch crown having a surface facing the housing, the watch crown disposed entirely external to the interior of the watch body;
an electromagnetic radiation source disposed within the housing and operable to emit a beam of electromagnetic radiation toward the surface; and
a sensor disposed within the housing and operable to characterize a movement of the watch crown based at least in part on a portion of the beam of electromagnetic radiation that impinges on and is redirected from the surface.

2. The watch body of claim 1, wherein the electromagnetic radiation source is mounted within the interior of the watch body and disposed to emit the beam of electromagnetic radiation through the housing.

3. The watch body of claim 1, wherein:
the electromagnetic radiation source has a resonant cavity;
the beam of electromagnetic radiation is generated within the resonant cavity;
the portion of the beam of electromagnetic radiation that impinges on and is redirected from the surface is received into the resonant cavity and coherently mixed with electromagnetic radiation generated within the resonant cavity; and
the sensor is operable to characterize the movement of the watch crown based at least in part on the coherent mixing of,
the portion of the beam of electromagnetic radiation that impinges on and is redirected from the surface; and
the electromagnetic radiation generated within the resonant cavity.

4. The watch body of claim 1, wherein:
the housing defines an opening extending through the housing; and
the beam of electromagnetic radiation is configured to be emitted through the opening.

5. The watch body of claim 4, wherein:
the housing comprises a cover positioned at least partially within the opening; and
the cover is formed from a material that is transparent to at least a wavelength of the beam of electromagnetic radiation.

6. The watch body of claim 1, wherein at least a portion of the housing is formed from a material that is transparent to a wavelength of the beam of electromagnetic radiation.

7. The watch body of claim 1, wherein the housing and the retaining feature are formed by a monolithic component.

8. An electronic watch comprising:
a housing defining an external surface;
a retainer protruding from the external surface and defining a cavity;
a watch crown positioned at least partially within the cavity and defining a surface facing the housing; and
a sensor system comprising:
an electromagnetic radiation source configured to emit a beam of electromagnetic radiation toward the surface of the watch crown, the beam of electromagnetic radiation dependent on a coherent mixing of electromagnetic radiation generated within a resonant cavity of the electromagnetic radiation source; and a sensor configured to characterize movement of the watch crown based on the coherent mixing of the electromagnetic radiation within the resonant cavity of the electromagnetic radiation source.

9. The electronic watch of claim 8, wherein:

the watch crown further comprises a cap positioned outside of the cavity, the cap defining the surface facing the housing; and a diameter of the watch crown is larger than a diameter of the retainer.

10. The electronic watch of claim 8, wherein an axis of the beam of electromagnetic radiation intersects the surface at an angle other than 90 degrees.

11. The electronic watch of claim 8, wherein an axis of the beam of electromagnetic radiation forms an acute angle with respect to the surface of the watch crown.

12. The electronic watch of claim 8, wherein:

the housing defines a window positioned at least partially over the electromagnetic radiation source; and the window comprises a lens that is transparent to a wavelength of the beam of electromagnetic radiation.

13. The electronic watch of claim 8, further comprising a film coating the external surface of the housing, the film passing a wavelength of the beam of electromagnetic radiation.

14. The electronic watch of claim 8, wherein the sensor comprises a photodetector adjacent the electromagnetic radiation source.

15. The electronic watch of claim 8, wherein the electromagnetic radiation source comprises a vertical-cavity surface-emitting laser (VCSEL).

16. The electronic watch of claim 8, wherein the electromagnetic radiation source is a first electromagnetic radiation source, the beam of electromagnetic radiation is a first beam of electromagnetic radiation, and the electronic watch further comprises:

a second electromagnetic radiation source configured to emit a second beam of electromagnetic radiation toward the surface of the watch crown;

a first lens over a first aperture of the first electromagnetic radiation source; and a second lens over a second aperture of the second electromagnetic radiation source, the first lens and the second lens altering a first direction of the first beam of electromagnetic radiation and a second direction of the second beam of electromagnetic radiation.

17. An electronic watch comprising:

a housing defining an external surface;

a rotatable watch crown positioned outside of the housing, the rotatable watch crown defining:

a first end defining a crown cap;

a second end opposite the first end and facing the external surface; and a first interlock feature circumscribing the rotatable watch crown between the first end and the second end;

a retaining feature coupled to the housing and defining a second interlock feature that interfaces with the first interlock feature, the retaining feature allowing the rotatable watch crown to rotate with respect to the housing; and a sensor system optically coupled to a surface of the rotatable watch crown and configured to characterize a movement of the rotatable watch crown.

18. The electronic watch of claim 17, wherein:

the sensor system comprises:

an electromagnetic radiation source configured to emit a beam of electromagnetic radiation toward the surface of the watch crown, the beam of electromagnetic radiation dependent on a coherent mixing of electromagnetic radiation generated within a resonant cavity of the electromagnetic radiation source; and a sensor configured to characterize movement of the rotatable watch crown based on the coherent mixing of the electromagnetic radiation within the resonant cavity of the electromagnetic radiation source.

19. The electronic watch of claim 18, wherein:

the housing defines an opening positioned at least partially over the sensor system; and the beam of electromagnetic radiation is configured to be emitted through the opening.

20. The electronic watch of claim 18, wherein the sensor system is positioned at least partially within a sidewall of the housing.

* * * * *